(12) United States Patent
Yoshimura et al.

(10) Patent No.: US 11,889,186 B2
(45) Date of Patent: Jan. 30, 2024

(54) FOCUS DETECTION DEVICE, FOCUS DETECTION METHOD, AND IMAGE CAPTURE APPARATUS

(71) Applicant: CANON KABUSHIKI KAISHA, Tokyo (JP)

(72) Inventors: Yuki Yoshimura, Tokyo (JP); Koichi Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/679,197

(22) Filed: Feb. 24, 2022

(65) Prior Publication Data
US 2022/0279113 A1    Sep. 1, 2022

(30) Foreign Application Priority Data

Feb. 26, 2021 (JP) ................... 2021-030626
Jun. 3, 2021 (JP) ................... 2021-093767

(51) Int. Cl.
*H04N 23/67* (2023.01)
*G06T 5/00* (2006.01)
*G02B 7/34* (2021.01)

(52) U.S. Cl.
CPC ............ *H04N 23/67* (2023.01); *G06T 5/006* (2013.01); *G02B 7/34* (2013.01); *G06T 2207/10148* (2013.01)

(58) Field of Classification Search
None
See application file for complete search history.

(56) References Cited

U.S. PATENT DOCUMENTS

2019/0394407 A1* 12/2019 Fukuda ................. H04N 25/61
2020/0267307 A1*  8/2020 Nishio ................ H04N 23/672

FOREIGN PATENT DOCUMENTS

JP      2000-156823 A     6/2000

* cited by examiner

*Primary Examiner* — Quan Pham
(74) *Attorney, Agent, or Firm* — Cowan, Liebowitz & Latman, P.C.

(57) ABSTRACT

A focus detection device calculates a shift amount between a first focus detection signal and a second focus detection signal both generated based on a signal obtained from an image sensor. The device also calculates a conversion coefficient and applies the conversion coefficient to the shift amount to convert the shift amount into a defocus amount of an imaging optical system. The device calculates the conversion coefficient based on at least one of a pupil eccentricity amount and an incident pupil distance, both are dependent on an image height at a focus detection position.

20 Claims, 19 Drawing Sheets

PLAN VIEW a-a CROSS-SECTIONAL VIEW

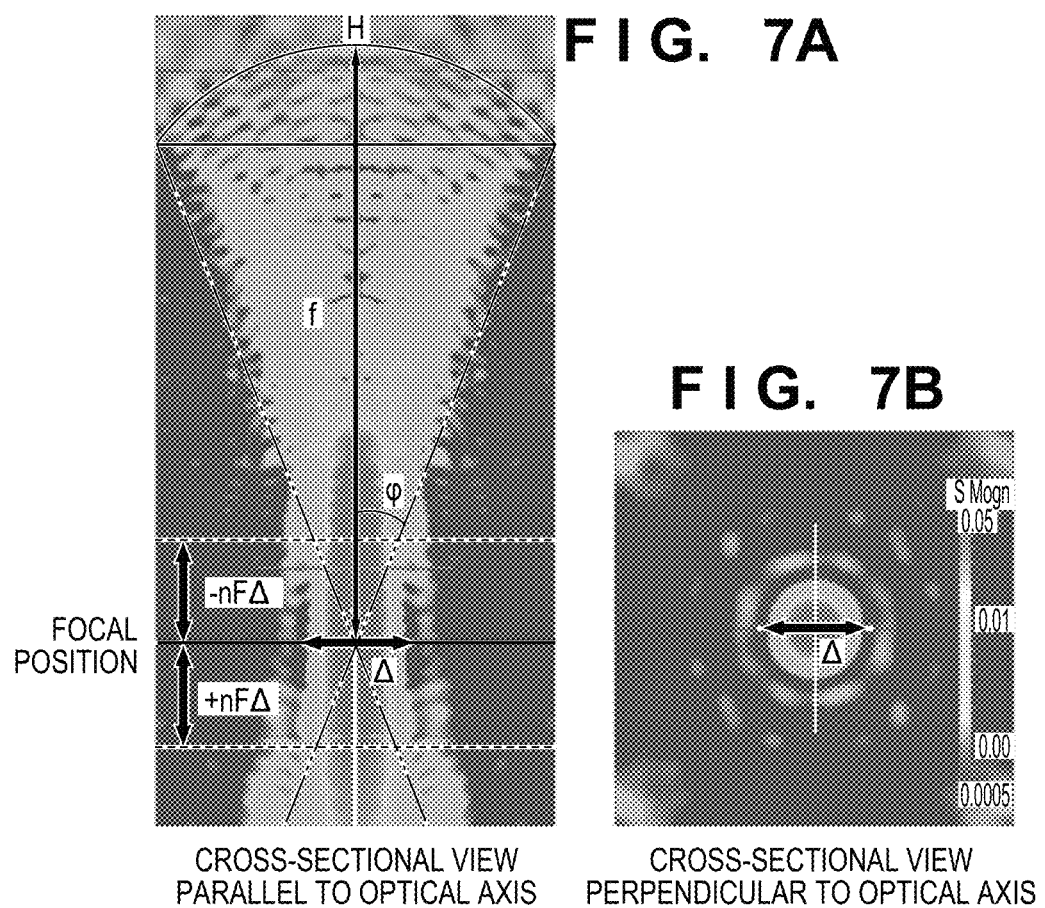
FIG. 7A
FIG. 7B
CROSS-SECTIONAL VIEW PARALLEL TO OPTICAL AXIS
CROSS-SECTIONAL VIEW PERPENDICULAR TO OPTICAL AXIS
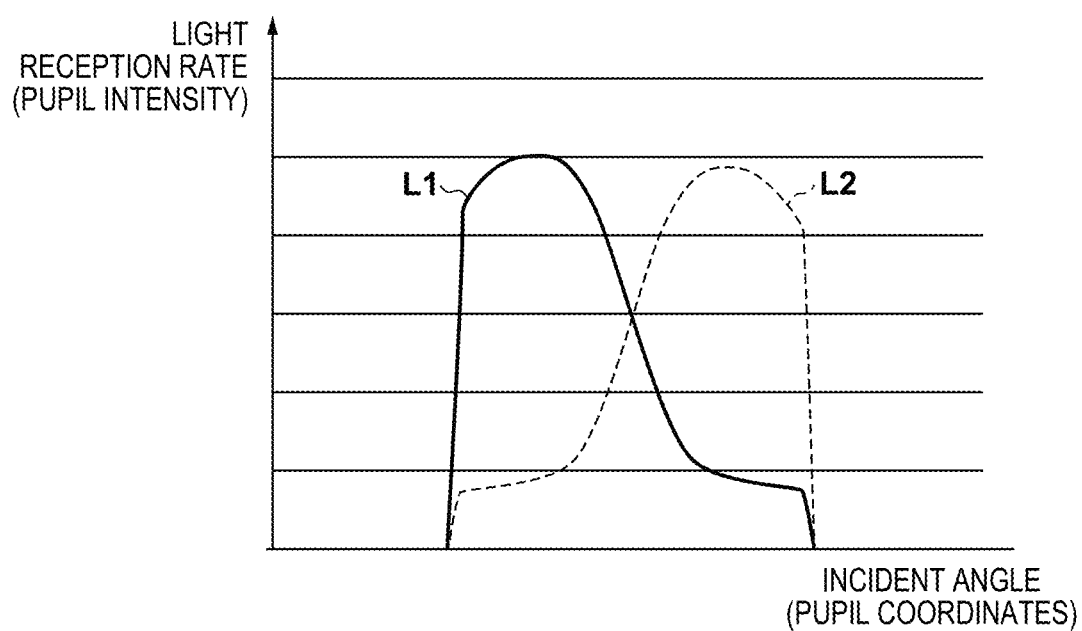
FIG. 8

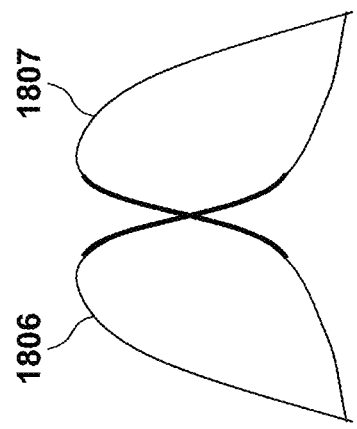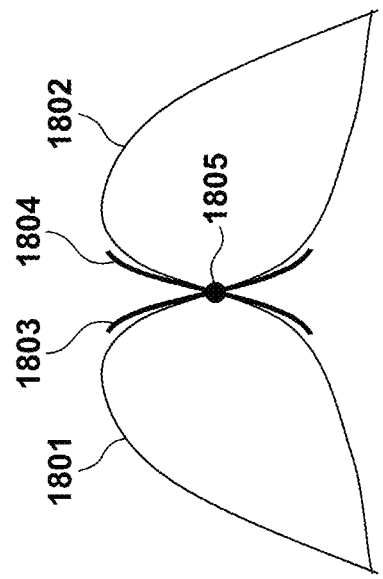

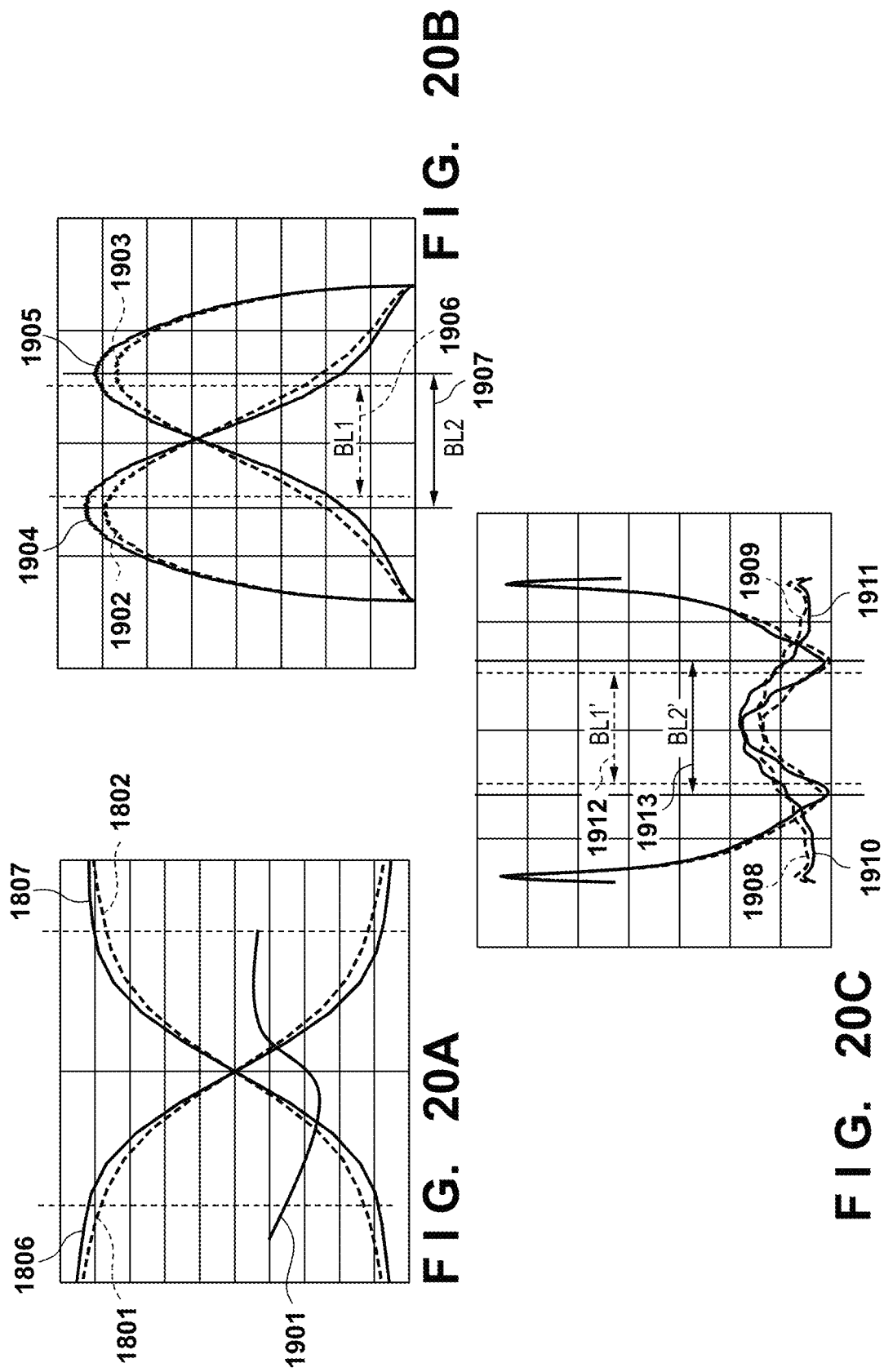

FOCUS DETECTION DEVICE, FOCUS DETECTION METHOD, AND IMAGE CAPTURE APPARATUS

BACKGROUND OF THE INVENTION

Field of the Invention

The present invention relates to a focus detection device, a focus detection method, and an image capture apparatus, and particularly relates to a focus detection device, a focus detection method, and an image capture apparatus that perform focus detection using an image sensor.

Description of the Related Art

An image sensor that enables image plane-based phase-detection AF is known (Japanese Patent Laid-Open No. 2000-156823). In Japanese Patent Laid-Open No. 2000-156823, some of a plurality of pixels arranged in a matrix serve as dedicated pixels configured to output signals for phase-detection AF (focus detection pixels), and focus detection of an imaging lens is performed based on a phase difference in signal pairs obtained from the focus detection pixels.

The accuracy of image plane-based phase-detection AF is affected by the quality of focus detection signals. Additionally, the quality of the focus detection signals is affected by manufacturing error in the image sensor.

SUMMARY OF THE INVENTION

One aspect of the present invention provides a focus detection device and a focus detection method that realize highly-accurate focus detection based on a focus detection signal obtained from an image sensor, taking into account manufacturing error in the image sensor.

According to an aspect of the present invention, there is provided a focus detection device comprising: one or more processors that execute a program stored in a memory and thereby function as: a generation unit that generates a first focus detection signal and a second focus detection signal based on a signal obtained from an image sensor; a first calculation unit that calculates a shift amount between the first focus detection signal and the second focus detection signal; a second calculation unit that calculates a conversion coefficient for converting the shift amount into a defocus amount of an imaging optical system; and a detection unit that detects the defocus amount by applying the conversion coefficient to the shift amount, wherein the second calculation unit calculates the conversion coefficient based on at least one of a pupil eccentricity amount and an incident pupil distance, both are dependent on an image height at a focus detection position.

According to another aspect of the present invention, there is provided an image capture apparatus, comprising: an image sensor; and a focus detection device that comprises: one or more processors that execute a program stored in a memory and thereby function as: a generation unit that generates a first focus detection signal and a second focus detection signal based on a signal obtained from an image sensor; a first calculation unit that calculates a shift amount between the first focus detection signal and the second focus detection signal; a second calculation unit that calculates a conversion coefficient for converting the shift amount into a defocus amount of an imaging optical system; and a detection unit that detects the defocus amount by applying the conversion coefficient to the shift amount, wherein the second calculation unit calculates the conversion coefficient based on at least one of a pupil eccentricity amount and an incident pupil distance, both are dependent on an image height at a focus detection position, wherein focus of an imaging optical system is adjusted based on a defocus amount detected by the focus detection device.

According to a further aspect of the present invention, there is provided a focus detection method executed by a focus detection device, the focus detection method comprising: generating a first focus detection signal and a second focus detection signal based on a signal obtained from an image sensor; calculating a shift amount between the first focus detection signal and the second focus detection signal; calculating a conversion coefficient for converting the shift amount into a defocus amount of an imaging optical system; and detecting the defocus amount by applying the conversion coefficient to the shift amount, wherein the calculating of the conversion coefficient includes calculating the conversion coefficient based on at least one of a pupil eccentricity amount and an incident pupil distance, both are dependent on an image height at a focus detection position.

According to another aspect of the present invention, there is provided a non-transitory computer-readable medium storing a program that causes, when executed by a computer of a focus detection device, the computer to function as: a generation unit that generates a first focus detection signal and a second focus detection signal based on a signal obtained from an image sensor; a first calculation unit that calculates a shift amount between the first focus detection signal and the second focus detection signal; a second calculation unit that calculates a conversion coefficient for converting the shift amount into a defocus amount of an imaging optical system; and a detection unit that detects the defocus amount by applying the conversion coefficient to the shift amount, wherein the second calculation unit calculates the conversion coefficient based on at least one of a pupil eccentricity amount and an incident pupil distance, both are dependent on an image height at a focus detection position.

Further features of the present invention will become apparent from the following description of exemplary embodiments (with reference to the attached drawings).

BRIEF DESCRIPTION OF THE DRAWINGS

FIGS. 7A and 7B are diagrams illustrating an example of optical intensity distribution inside a pixel according to the first embodiment.

FIG. 8 is a diagram illustrating a partial pupil region according to the first embodiment.

FIGS. 19A and 19B are diagrams illustrating an example of a reference pupil intensity distribution and an individual intensity distribution according to a second embodiment.

FIGS. 20A to 20C are diagrams illustrating a conversion coefficient correction value calculation method according to the second embodiment.

DESCRIPTION OF THE EMBODIMENTS

Figure 1:
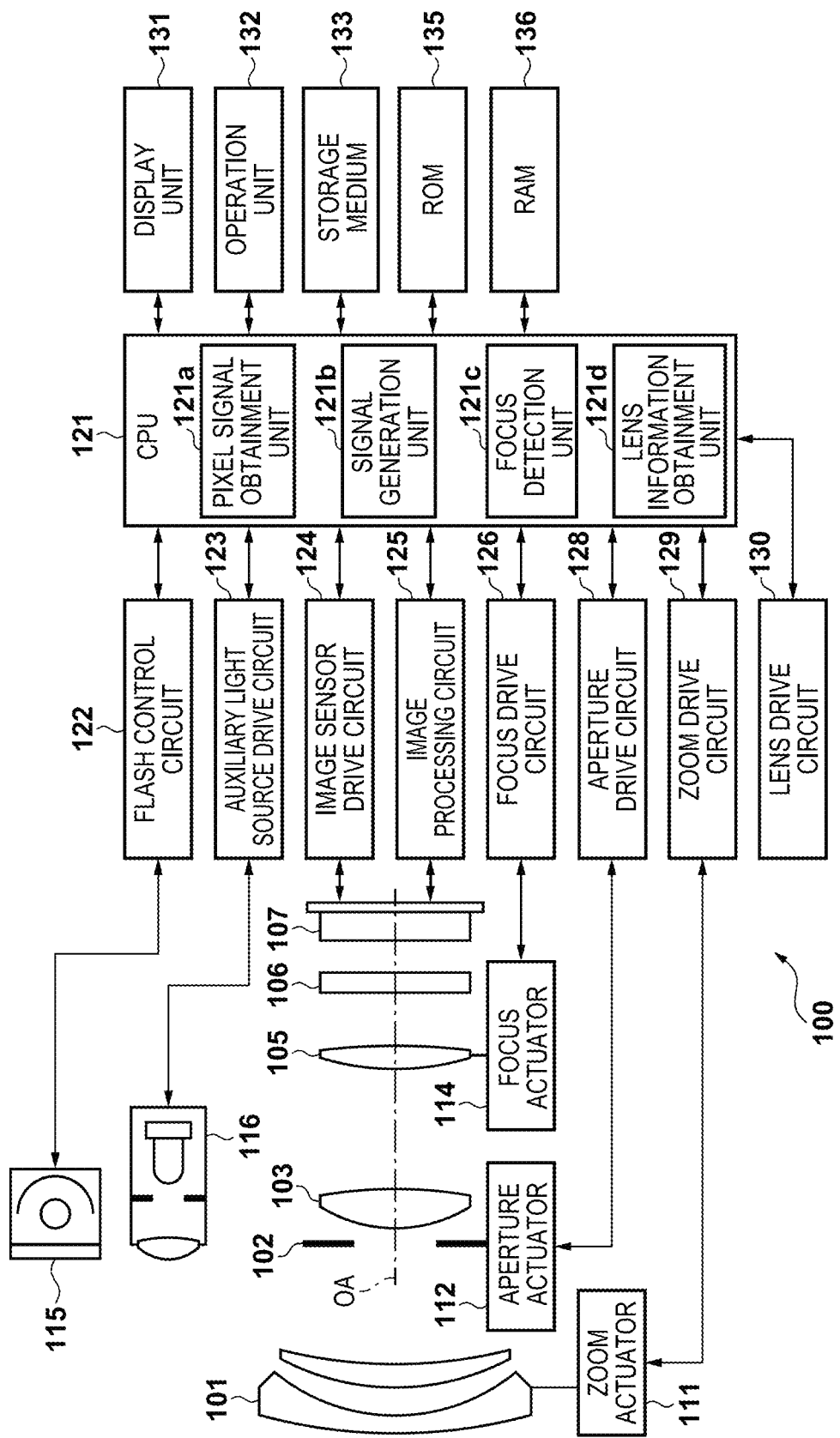
FIG. 1 is a block diagram illustrating an example of the functional configuration of an image capture apparatus serving as a focus detection device according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiments will describe a case where the present invention is applied in an image capture apparatus such as a digital camera. However, the present invention can be applied in any electronic device capable of processing signals from an image sensor. Examples of such an electronic device include computer devices (personal computers, tablet computers, media players, PDAs, and the like), mobile phones, smartphones, game consoles, robots, drones, and dashboard cameras. These are merely examples, however, and the present invention can be applied in other electronic devices as well.

First Embodiment

Overall Configuration

FIG. 1 is a block diagram illustrating an example of the functional configuration of an image capture apparatus 100 including a focus detection device according to embodiments. The image capture apparatus 100 is a digital camera system including a camera body and an interchangeable lens (imaging optical system or optical imaging system) that can be attached to and removed from the camera body. However, the focus detection device according to the embodiment can also be applied in an image capture apparatus in which the camera body and the imaging optical system are integrated.

The imaging optical system includes a first lens group 101, an aperture stop 102, a second lens group 103, and a third lens group 105, and forms an optical image of a subject on an image capturing plane of an image sensor 107. The first lens group 101 is located closest to the front (the subject side) of the plurality of lens groups constituting the imaging optical system, and can move forward and backward along an optical axis OA. The aperture stop 102 has an adjustable aperture amount and functions as a mechanical shutter when capturing still images.

The second lens group 103 moves forward and backward along the optical axis OA along with the aperture stop 102, and changes the focal length (angle of view) of the imaging optical system in conjunction with the forward and backward movement of the first lens group 101. The third lens group 105 is a focus lens that changes the focusing distance of the imaging optical system by moving forward and backward along the optical axis OA.

An optical low-pass filter 106 is provided to reduce false colors, moiré, and the like in captured images.

The image sensor 107 is, for example, a CMOS image sensor or CCD image sensor having a pixel array (also called a "pixel region") constituted by m pixels in the horizontal direction and n pixels in the vertical direction, arranged two-dimensionally. Each pixel is provided with a color filter based on the primary color Bayer array and an on-chip microlens. Note that the image sensor 107 may be a three-plate color image sensor.

A zoom actuator 111 moves the first lens group 101 and the second lens group 103 in the optical axis direction by rotating a cam cylinder (not shown), for example. An aperture actuator 112 drives the aperture stop 102. A focus actuator 114 moves the third lens group 105 in the optical axis direction. Note that a mechanical shutter separate from the aperture stop 102 and a shutter actuator that drives the mechanical shutter may be provided.

A flash 115 is a light source that illuminates the subject. The flash 115 includes a flash emission device that uses a xenon tube, or an LED (light-emitting diode) that emits continuous light. An AF (autofocus) auxiliary light source 116 projects a predetermined pattern image through a projection lens. This improves the focus detection performance for low-luminance or low-contrast subjects.

A CPU 121 controls the operations of the image capture apparatus 100 as a whole. The CPU 121 includes an arithmetic unit, ROM, RAM, an A/D converter, a D/A converter, a communication interface circuit, and the like. By reading a program stored in ROM 135 into RAM 136 and executing the program, the CPU 121 controls each part of the image capture apparatus 100 and realizes the functions of the image capture apparatus 100, such as automatic focus detection (AF), image capturing, image processing, recording, and the like. Some of the functions realized by the CPU 121 by executing programs may be implemented by hardware circuits separate from the CPU 121. Reconfigurable circuits such as FPGAs may be used for some of the circuits as well. For example, some calculations may be performed by a dedicated hardware circuit to reduce the time required for the calculations for focus detection (described later).

A pixel signal obtainment unit 121a, a signal generation unit 121b, a focus detection unit 121c, and a lens information obtainment unit 121d are functions realized by the CPU 121 executing programs, and are indicated as function blocks. The communication interface circuit included in the CPU 121 supports one or more standards for wired and wireless communication. The image capture apparatus 100 can communicate with external devices directly or via other devices through the communication interface circuit.

A flash control circuit 122 controls the lighting of the flash 115 in synchronization with image capture operations. An auxiliary light source drive circuit 123 controls the lighting of the AF auxiliary light source 116 in synchronization with focus detection processing. An image sensor drive circuit 124 controls the image capture operations by the image sensor 107, as well as performing A/D conversion on signals obtained from the image capture operations and transmitting those image signals to the CPU 121. An image processing circuit 125 can apply various types of image processing to image data, such as gamma conversion, color interpolation, encoding, decoding, evaluation value generation, detection of feature regions, and the like.

A focus drive circuit 126 drives the focus actuator 114 based on a focus detection result from the focus detection unit 121c and the like to move the third lens group 105 along the optical axis OA, and adjusts the focusing distance of the imaging optical system as a result.

An aperture drive circuit 128 controls the diameter, and the opening and closing, of the aperture stop 102 by driving the aperture actuator 112. A zoom drive circuit 129 changes the focal length (angle of view) of the imaging optical system by, for example, driving the zoom actuator 111 in response to a user instruction and moving the first lens group 101 and the second lens group 103 along the optical axis OA.

A lens communication circuit 130 communicates with the interchangeable lens attached to the camera body under the control of the CPU 121. The lens communication circuit 130 obtains lens information from the interchangeable lens, for example, and supplies the lens information to the lens information obtainment unit 121d of the CPU 121. The lens communication circuit 130 can also transmit information and commands from the camera body to the interchangeable lens.

The interchangeable lens and the camera body have mechanically detachable mount units. The mount unit of the interchangeable lens and the mount unit of the camera body are provided with a plurality of contacts configured to make contact when the interchangeable lens is in a mounted state. The interchangeable lens and the camera body are electrically connected through the contacts for communication, supplying power, and the like.

The interchangeable lens is provided with a board including a lens CPU, lens memory, a lens gyro, and the like (not shown). The lens CPU uses correction values and the like stored in the lens memory to execute various types of programs. The lens memory also stores optical characteristics of the lens, such as aberration information, exit pupil distance LPO, and the like. The CPU 121 (the lens information obtainment unit 121d) can obtain lens information such as a current focus state FS, zoom state ZS, exit pupil distance LPO, and the like of the interchangeable lens through the lens communication circuit 130.

A display unit 131 includes, for example, an LCD (liquid crystal display device). The display unit 131 displays information pertaining to the image capture mode of the image capture apparatus 100, a preview image before an image is captured, a confirmation image after an image is captured, a focus state display image during focus detection, and the like. An operation unit 132 includes a power switch, a release switch, a zoom operation switch, an image capture mode selection switch, and the like. The release switch includes two switches, namely SW1, which turns on when depressed halfway, and SW2, which turns on when fully depressed. A storage medium 133 is, for example, a semiconductor memory card that can be attached to and removed from the image capture apparatus 100, and still image data and moving image data obtained from capturing are recorded into the storage medium 133.

Note that if the display unit 131 is a touch screen, a touch panel, a combination of a touch panel and a GUI displayed in the display unit 131, or the like may be used as the operation unit 132. For example, the configuration can be such that when a tap operation on the touch panel is detected during a live view display, focus detection is performed using an image region corresponding to the tapped position as the focus detection region.

Note that contrast information of captured image data can also be calculated by the image processing circuit 125, with the CPU 121 executing contrast AF. In contrast AF, the contrast information is calculated sequentially while moving the third lens group 105 and changing the focusing distance of the imaging optical system, and the focus lens position where the contrast information peaks is set as the in-focus position.

In this manner, the image capture apparatus 100 can perform both image plane-based phase-detection AF and contrast AF, and one of these can be used selectively, or both in combination, according to the situation.

Image Sensor

The pixel array and pixel structure of the image sensor 107 will be described with reference to FIGS. 2 to 3B. The left-right direction in FIG. 2 corresponds to an x direction (a horizontal direction); the up-down direction, to a y direction (a vertical direction); and a direction orthogonal to the x and y directions (perpendicular to the paper), to a z direction (an optical axis direction). The example illustrated in FIG. 2 illustrates the pixel (unit pixel) array of the image sensor 107 in a range of four columns by four rows, and a sub-pixel array in a range of eight columns by four rows.

A two-column by two-row pixel group 200, for example, has a pixel 200R having spectral sensitivity to a first color R (red) in an upper-left position, a pixel 200G having spectral sensitivity to a second color G (green) in upper-right and lower-left positions, and a pixel 200B having spectral sensitivity to a third color B (blue) in a lower-right position. Furthermore, each pixel (unit pixel) is divided into two parts in the x direction (Nx divisions) and one part in the y direction (Ny divisions) (a division number $N_{LF}=Nx \times Ny$), and is therefore constituted by a plurality of sub-pixels, namely a first sub-pixel 201 and a second sub-pixel 202 (from a first sub-pixel to an $N_{LF}$-th sub-pixel).

Figure 2:
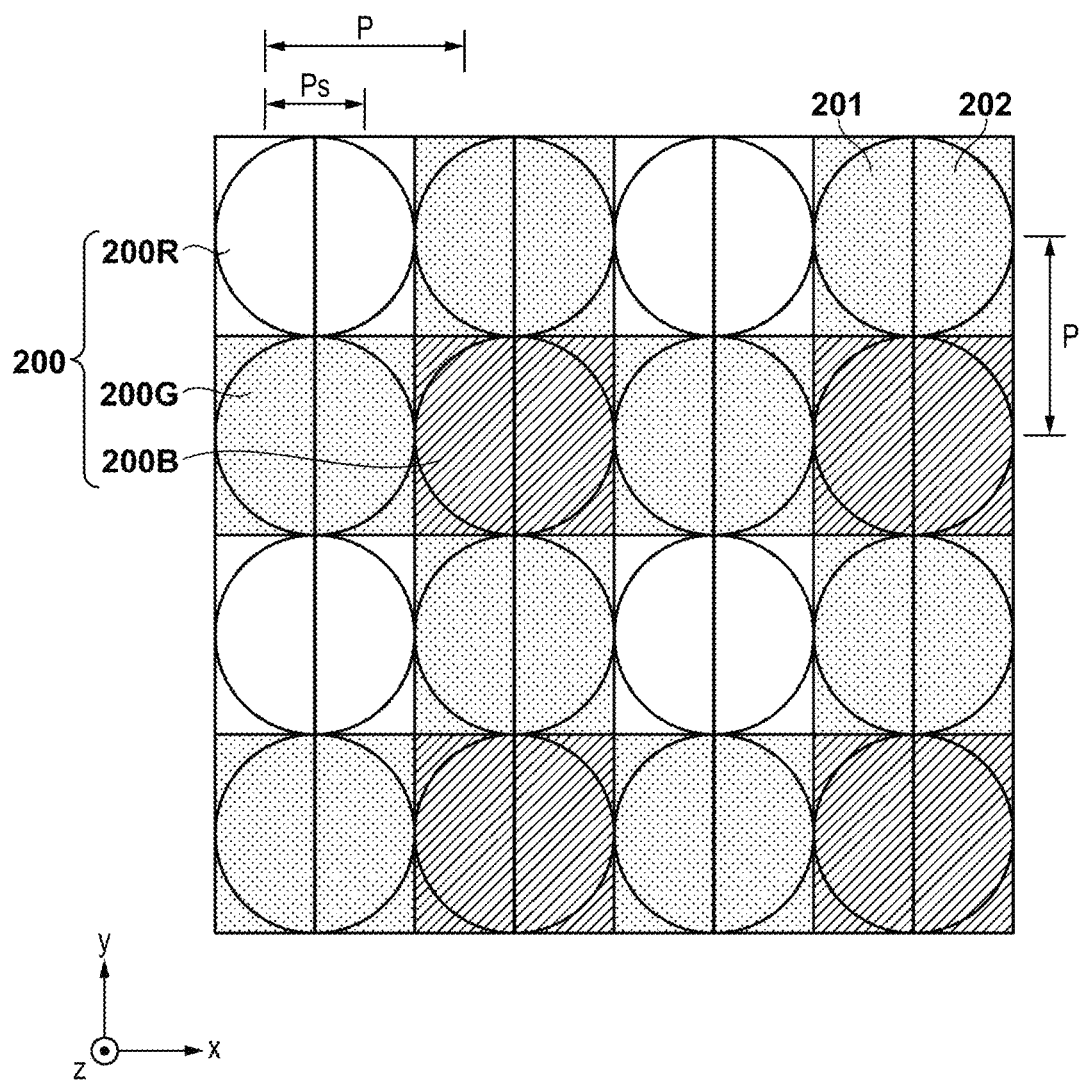
FIG. 2 is a diagram schematically illustrating a pixel array according to the first embodiment.

In the example illustrated in FIG. 2, by dividing each pixel of the image sensor 107 into two sub-pixels aligned in the horizontal direction, it is possible to generate a number of viewpoint images equal to the division number $N_{LF}$ and a captured image that is a composite of all the viewpoint images from an image signal obtained from a single shot (LF data). Note that the pixels may be divided in two directions, and the number of divisions per direction is not limited. As such, it can be said that the viewpoint images are images generated from the signals of some of the plurality of sub-pixels, and the captured image is an image generated from the signals of all the sub-pixels. In the present embodiment, as an example, a pixel period P of the image sensor 107 in the horizontal and vertical directions is 6 μm, a horizontal pixel number $N_H$=6,000, and a vertical pixel number $N_V$=4,000. A total pixel number N is therefore $N_H \times N_V$=24 million. If a horizontal period $P_S$ of the sub-pixels is 3 μm, a total sub-pixel number $N_S = N_H \times (P/P_S) \times N_V$=48 million.

Figure 3A:
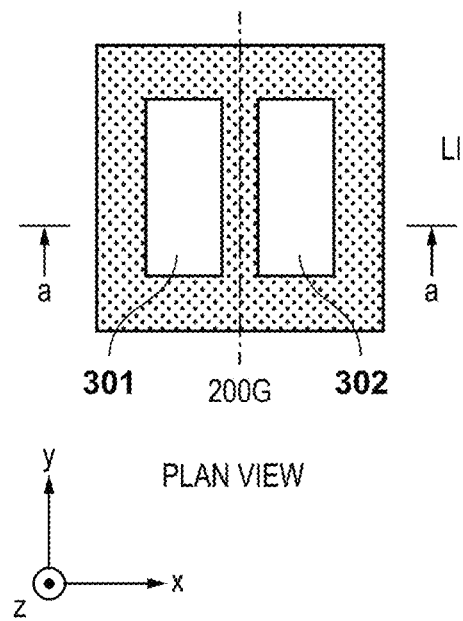
FIGS. 3A and 3B are a schematic plan view and a schematic cross-sectional view of a pixel according to the first embodiment.

FIG. 3A is a plan view of one pixel 200G of the image sensor 107 illustrated in FIG. 2, viewed from a light receiving surface-side (+z side) of the image sensor 107. The z axis is set in the direction perpendicular to the paper surface in FIG. 3A, and the front side is defined as the positive direction in the z axis. Additionally, the y axis is set in the up-down direction orthogonal to the z axis, and "upward" is defined as the positive direction in the y axis; and the x axis is set in the left-right direction orthogonal to the z axis and y axis, and "rightward" is defined as the positive direction of the x axis. FIG. 3B is a cross-sectional view taken from the −y side along an a-a cut line in FIG. 3A.

Figure 3B:
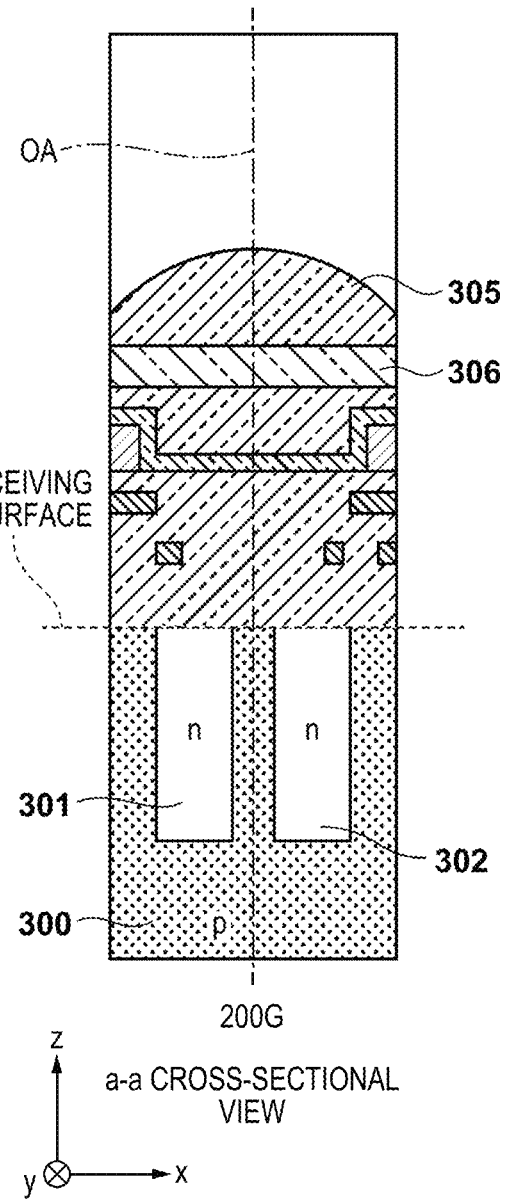

As illustrated in FIGS. 3A and 3B, microlenses 305 are formed on the light receiving surface-side (the +z direction) of each pixel 200G, and incident light is focused by the microlenses 305. Furthermore, a plurality of photoelectric conversion units having two divisions are formed, with two divisions in the x (horizontal) direction and one division in the y (vertical) direction, for a first photoelectric conversion unit 301 and a second photoelectric conversion unit 302. The first photoelectric conversion unit 301 and the second photoelectric conversion unit 302 correspond to the first sub-pixel 201 and the second sub-pixel 202, respectively, in FIG. 2. Described more generally, when the photoelectric conversion unit of each pixel is divided into Nx divisions in the x direction and Ny divisions in the y direction, and the division number $N_{LF}$ of the photoelectric conversion unit is $N_{LF}$=Nx×Ny, first to $N_{LF}$-th photoelectric conversion units corresponds to the first to $N_{LF}$-th sub-pixels.

The first photoelectric conversion unit 301 and the second photoelectric conversion unit 302 are two independent pn junction photodiodes, constituted by a p-type well layer 300 and two divided n-type layers 301 and 302. If necessary, the units may be interposed between intrinsic layers and formed as a pin structure photodiode. In each pixel, a color filter 306 is formed between the microlens 305, and the first photoelectric conversion unit 301 and second photoelectric conversion unit 302. If necessary, the spectral transmittance of the color filter 306 may be changed for each pixel or each photoelectric conversion unit, or the color filter may be omitted.

The light incident on the pixel 200G is focused by the microlens 305, further spectrally divided by the color filter 306, and then received by the first photoelectric conversion unit 301 and the second photoelectric conversion unit 302, respectively. In the first photoelectric conversion unit 301 and the second photoelectric conversion unit 302, electrons and holes are produced in pairs according to the amount of light received, and electrons are stored after being separated by a barrier layer. On the other hand, the holes are discharged to the exterior of the image sensor 107 through a p-type well layer connected to a constant voltage source (not shown). The electrons accumulated in the first photoelectric conversion unit 301 and the second photoelectric conversion unit 302 are transferred to an electrostatic capacitance unit (FD) via a transfer gate and converted into voltage signals.

Note that in the present embodiment, the microlenses 305 correspond to an optical system in the image sensor 107. The optical system in the image sensor 107 may be configured to use microlenses as in the present embodiment, or may be configured to use a material having a different refractive index, such as a waveguide or the like. Additionally, the image sensor 107 may be a backside-illuminated image sensor having circuits and the like on the surface opposite the surface having the microlenses 305, or may be a stacked image sensor including some circuits such as the image sensor drive circuit 124, the image processing circuit 125, and the like. Materials other than silicon may be used as the semiconductor substrate, and for example, an organic material may be used as the photoelectric conversion material.

Pupil Division

The pupil division function of the image sensor 107 according to the present embodiment will be described next with reference to FIGS. 4 to 8.

Figure 4:
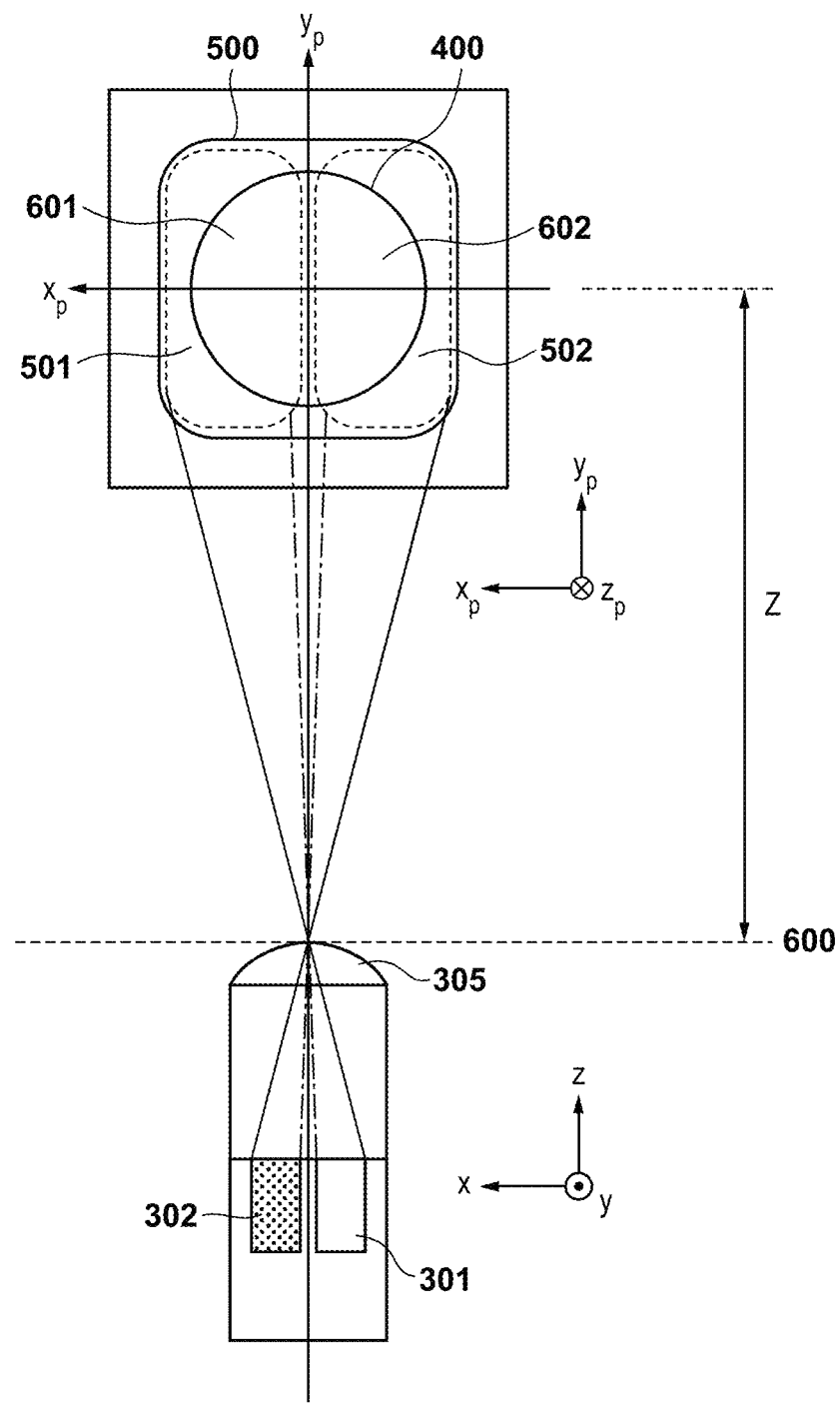
FIG. 4 is a diagram illustrating correspondence between a pixel in an image sensor according to the first embodiment and a pupil intensity distribution.

FIG. 4 illustrates a cross-sectional view of an a-a cross-section of the pixel 200G arranged in the image sensor 107 of the present embodiment illustrated in FIG. 3A, seen from the +y side, as well as a pupil plane located a distance Z in the z axis direction (the direction of the optical axis OA) from an image capturing plane 600 of the image sensor 107. Note that in FIG. 4, the x axis and they axis of the cross-sectional view are inverted with respect to FIGS. 3A and 3B in order to correspond to the coordinate axes of the exit pupil plane. The image capturing plane 600 of the image sensor 107 is located on an image formation plane of the imaging optical system.

A pupil intensity distribution (first pupil intensity distribution) 501 is, through the microlens 305, in a substantially conjugate relationship with the light receiving surface of the first photoelectric conversion unit 301, a center of gravity position of which is eccentric in the −x direction. Accordingly, the first pupil intensity distribution 501 corresponds to a pupil region in which light can be received by the first sub-pixel 201. The center of gravity position of the first pupil intensity distribution 501 is eccentric to a +xp side on the pupil plane. Likewise, a pupil intensity distribution (second pupil intensity distribution) 502 is, through the microlens 305, in a substantially conjugate relationship with the light receiving surface of the second photoelectric conversion unit 302, a center of gravity position of which is eccentric in the +x direction.

Accordingly, the second pupil intensity distribution 502 corresponds to a pupil region in which light can be received by the second sub-pixel 202. The center of gravity of the second pupil intensity distribution 502 is eccentric to a −xp side on the pupil plane. A pupil intensity distribution 500 is a pupil region in which light can be received by the entire pixel 200G when all of the first photoelectric conversion units 301 and the second photoelectric conversion units 302 (the first sub-pixels 201 and the second sub-pixels 202) are combined. In other words, the first pupil intensity distribution 501 is eccentric to the +xp side on the pupil plane relative to the center of the pupil intensity distribution 500, and the second pupil intensity distribution 502 is eccentric to the −xp side on the pupil plane relative to the center of the pupil intensity distribution 500.

Figure 5:
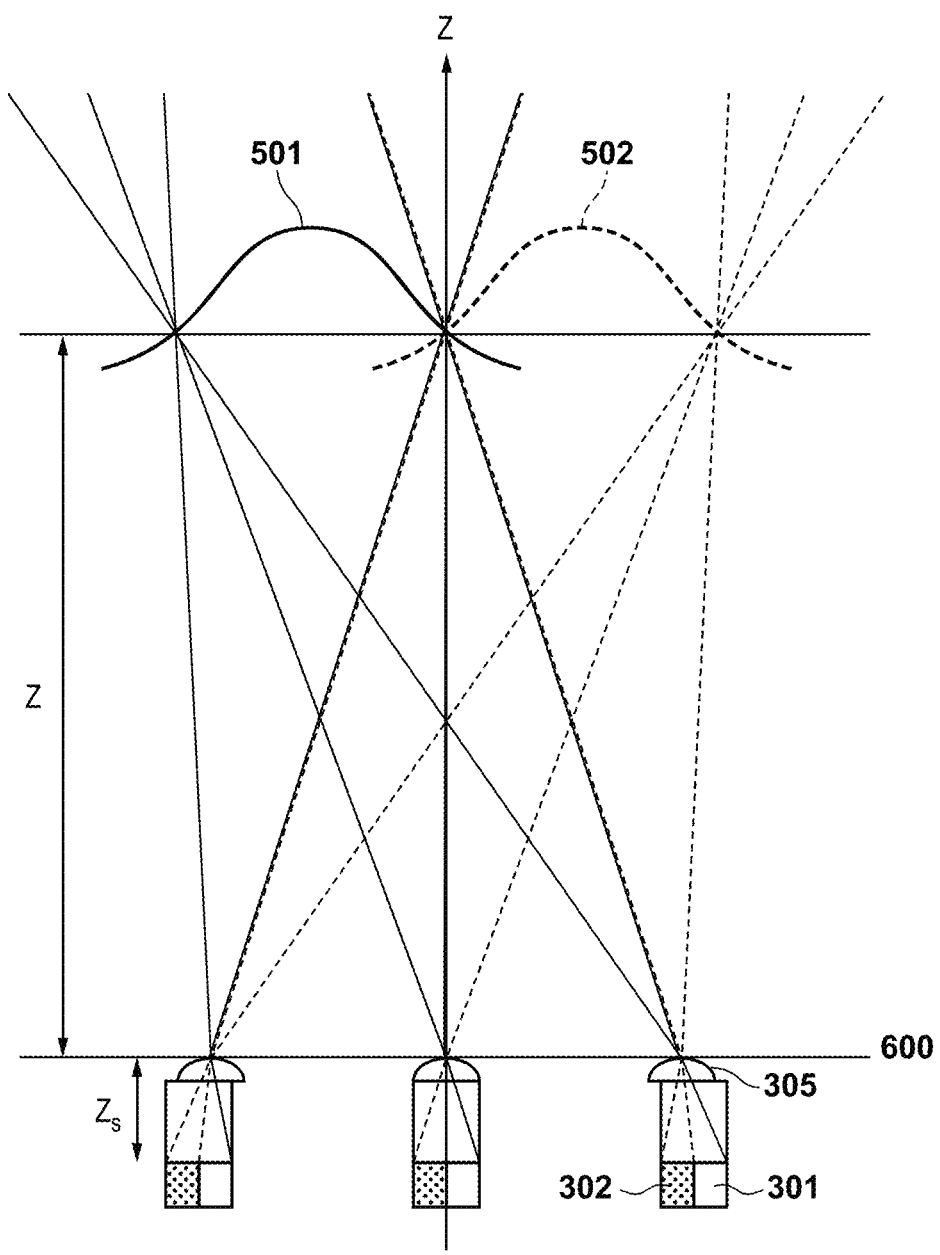
FIG. 5 is a diagram illustrating correspondence between the image sensor according to the first embodiment and the pupil intensity distribution.

An example of the sensor incident pupil of the image sensor 107 will be described next with reference to FIG. 5. FIG. 5 schematically illustrates the arrangement of the microlenses 305 according to the image height of the pixel. The Z axis passes through the center of the image sensor (image height=0), and the image height increases with distance from the center.

In the image sensor 107, the microlenses 305 are arranged so that the greater the image height of the corresponding pixel, the closer an intersection point between the optical axis of the microlens 305 and the photoelectric conversion unit is to the center of the image sensor (the origin of the image height). Note that the intersection point between the center of the image sensor and the optical axis of the imaging optical system does shift when the lens or image sensor is driven by an optical image stabilization mechanism, but is substantially identical.

In this manner, the position of the microlens 305 is shifted in the direction of the center of the image sensor 107 by an amount corresponding to the image height of the corresponding pixel. As a result, the first pupil intensity distributions 501 corresponding to the first photoelectric conversion units 301 of the first sub-pixels 201 of pixels having different image heights in the pupil plane at the distance Z from the image sensor 107 will be approximately the same. Likewise, the second pupil intensity distributions 502 corresponding to the second photoelectric conversion units 302 of the second sub-pixels 202 will be approximately the same.

As a result, the first pupil intensity distribution 501 and the second pupil intensity distribution 502 of all pixels of the image sensor 107 in the pupil plane at the distance Z from the image sensor 107 can be caused to be essentially the same. Hereinafter, the first pupil intensity distribution 501 and the second pupil intensity distribution 502 will be referred to as the "sensor incident pupil" of the image sensor 107, and the distance Z as the "incident pupil distance" of the image sensor 107. Ensuring that the incident pupil distance is equal for all pixels makes it possible to suppress a drop in light amount in pixels in peripheral regions where the image height is high.

Figure 6:
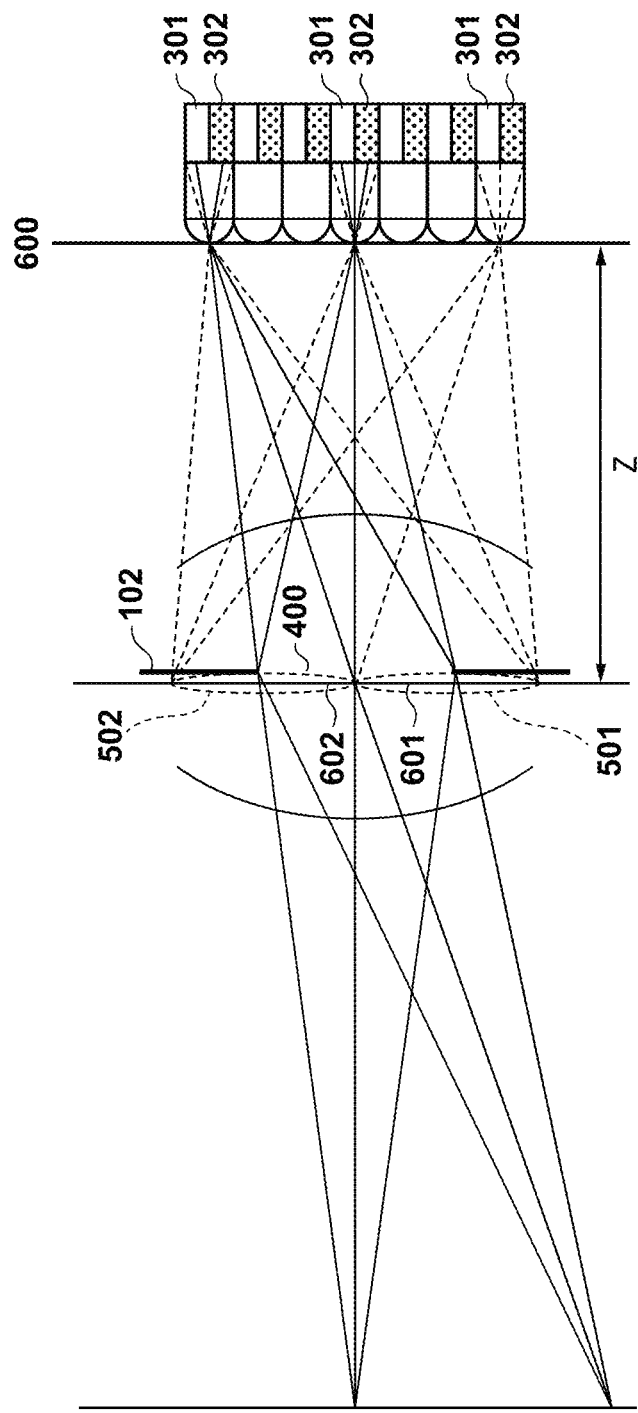
FIG. 6 is a diagram illustrating pupil division in an imaging optical system and an image sensor 107 according to the first embodiment.

FIG. 6 illustrates optical division (pupil division) of the exit pupil of the imaging optical system by the sensor incident pupil (the first pupil intensity distribution 501 and second pupil intensity distribution 502) of the image sensor 107. An exit pupil 400 of the imaging optical system has a size corresponding to the aperture amount of the aperture stop 102. Of the light flux from the subject, the light flux that passes through a partial pupil region (a first partial pupil region) 601, which is an overlapping region between the exit pupil 400 of the imaging optical system and the pupil intensity distribution 501, is received by the first sub-pixel 201 (the first photoelectric conversion unit 301). Likewise, of the light flux from the subject, the light flux that passes through a partial pupil region (a second partial pupil region) 602, which is an overlapping region between the exit pupil 400 of the imaging optical system and the pupil intensity distribution 502, is received by the second sub-pixel 202 (the second photoelectric conversion unit 302).

FIG. 4 illustrates the first partial pupil region 601 and the second partial pupil region 602 in the pupil plane located at the incident pupil distance Z of the image sensor 107. The exit pupil of the imaging optical system is divided into the first partial pupil region 601 and the second partial pupil region 602 by the sensor incident pupil (the first pupil intensity distribution 501 and the second pupil intensity distribution 502) of the image sensor 107. In other words, the region (surface area) common to the first pupil intensity distribution 501 and the second pupil intensity distribution 502, and the exit pupil of the imaging optical system, is the first partial pupil region 601 and the second partial pupil region 602.

FIGS. 7A and 7B are diagrams schematically illustrating an optical intensity distribution when light is incident on the microlens 305 formed on each pixel. The optical intensity distribution illustrates in FIGS. 7A and 7B are calculated by the FDTD (Finite Difference Time Domain) method for the optical intensity distribution inside the image sensor 107. Here, as an example, assume that a plane wave of right circular polarized light having a wavelength λ=540 nm is incident from above the microlens 305 parallel to the optical axis of the microlens.

FIG. 7A illustrates the optical intensity distribution in a cross-section parallel to the optical axis of the microlens. The microlens optical system of each pixel is constituted by the microlens 305, a planarization layer, an encapsulation layer, and an insulating layer. The microlens optical system may include a plurality of microlenses.

Assume that a pixel period is represented by 2a, the focal length of the microlens optical system is represented by f, and an aperture angle of the microlens optical system is represented by 2φ. Assume also that the refractive index at the focal position of the microlens optical system is represented by n. Finally, assume that z represents the coordinate on the optical axis. The coordinate z is set to the focal position as the origin (z=0), with the negative sign on the microlens side (upper part of the drawing) and the positive sign on the opposite side from the microlens. Furthermore, H represents the principle point.

A numerical aperture NA of the microlens optical system is defined by the following Formula (1).

$$NA = n \cdot \sin \varnothing \qquad (1)$$

An aperture value F of the microlens optical system is defined by the following Formula (2).

$$F = \frac{1}{2n \cdot \sin\varnothing} = \frac{f}{2n \cdot a} \qquad (2)$$

The incident light on the pixel is focused at the focal position by the microlens optical system. However, due to the effect of diffraction caused by the wave nature of light, the diameter of the focused spot cannot be made smaller than a diffraction limit Δ and is therefore of a limited size. Assuming that the intensity distribution of the focused spot is close to the Airy pattern, the diffraction limit Δ is obtained, approximately, by the following Formula (3), where the wavelength of the incident light is represented by 2.

$$\Delta = 1.22 \frac{\lambda}{n \cdot \sin\varnothing} = 2.44 \cdot \lambda \cdot F \qquad (3)$$

The size of the light receiving surface of the photoelectric conversion unit is approximately 1-3 µm on each side, and if the diameter of the focused spot of the microlens is equal to the diffraction limit Δ, is about 1 µm. Accordingly, the sensor incident pupils (the first pupil intensity distribution 501 and the second pupil intensity distribution 502), which are in a conjugate relationship with the light receiving surface of the photoelectric conversion unit through the microlens, are not clearly pupil-divided due to diffraction blur, resulting in a light reception rate distribution (pupil intensity distribution) that depends on the incident angle of the light.

FIG. 7B schematically illustrates the optical intensity distribution in a cross-section perpendicular to the optical axis of the microlens at the focal position of the microlens. At a point position (z=0), the diameter of the focused spot is at the diffraction limit Δ and is therefore a minimum.

A rear focal depth $+z_D$ and a front focal depth $-z_D$ of the microlens optical system are obtained by the following Formula (4), where the diffraction limit Δ serves as a permissible circle of confusion. The range of the focal depth is $-z_D \leq z \leq +z_D$.

$$\pm z_D = \pm n \cdot F \cdot \Delta \quad (4)$$

Assuming that the intensity distribution of the focused spot is close to a Gaussian distribution, a diameter w of the focused spot at coordinate z can be expressed, approximately, by the following Formula (5).

$$w(z) = \Delta \sqrt{1 + \left(\frac{z}{z_R}\right)^2} \quad (5)$$

Here, $z_R$ represents the Rayleigh length, defined as $z_R = \alpha R_{zD}$, with the coefficient $\alpha R = 0.61\pi \approx 1.92$.

In the calculation example illustrated in FIGS. 7A and 7B, the wavelength λ=540 nm, the pixel period 2a=4.3 μm, the focal length f of the microlens optical system=5.8 μm, the refractive index n at the focal position=1.46, and the aperture value F of the microlens optical system=0.924. In this case, the diffraction limit Δ is approximately 1.22 μm and the focal depth $\pm z_D$ is approximately ±1.65 μm.

FIG. 8 illustrates an example of a relationship between the light incident angle and the light reception rate for the first partial pupil region 601 and the second partial pupil region 602 of the present embodiment. The horizontal axis represents an incident angle θ of light (which can be converted to pupil coordinates), and the vertical axis represents the light reception rate. The graph line L1 indicated by a solid line in FIG. 8 represents the light reception rate distribution along the X axis of the first partial pupil region 601 in FIG. 4, and the graph line L2 indicated by a dotted line represents the light reception rate distribution along the X axis of the second partial pupil region 602.

The light incident angle relative to the first partial pupil region 601 and the second partial pupil region 602 is limited by the exit pupil, which is defined by a lens frame, an aperture frame, and the like of the imaging optical system. Accordingly, as illustrated in FIG. 8, the light reception rate of a first partial pupil region L1 and a second partial pupil region L2 drops drastically when the incident angle reaches a certain value. On the other hand, for an incident angle within the range of pupil division by the microlens, the light reception rate changes gradually because the boundaries of the partial pupil regions are blurred due to diffraction. Although an example where the pupil region area is divided in two in the horizontal direction is described here, the pupil region can also be divided in the vertical direction.

Each pixel of the image sensor 107 includes a plurality of sub-pixels that share a single microlens. The sub-pixels receive light fluxes that pass through mutually-different parts of the pupil region of the imaging optical system. In the present embodiment, the configuration is such that two sub-pixels share a single microlens, but a greater number of sub-pixels may share a single microlens. By having a plurality of sub-pixels share a single microlens, the signals of all the sub-pixels in each pixel can be composited to be used as an image capture signal, and the signal of each sub-pixel can be used as a signal for focus detection. However, a pixel provided only with the first sub-pixel 201 and a pixel provided only with the second sub-pixel 202 may be provided as well. In this case, a pixel having only one sub-pixel becomes a dedicated focus detection pixel. Likewise, a pixel having a photoelectric conversion region that is not divided into sub-pixels may be provided as well. This pixel receives a light flux passing through a region obtained by combining the partial pupil regions 601 and 602, and becomes a dedicated image capture pixel.

In the present embodiment, a first focus detection signal is generated based on the pixel signal from the first sub-pixel 201 in each of the pixels in the image sensor 107, and a second focus detection signal is generated based on the pixel signal from the second sub-pixel 202 in each of the pixels. A defocus amount of the imaging optical system is obtained using the first focus detection signal and the second focus detection signal, and phase-detection AF is executed to adjust the focal point of the imaging optical system according to the defocus amount.

Additionally, an image capture signal (captured image) having a resolution corresponding to an effective pixel number N can be generated by adding the signals from the first sub-pixel 201 and the second sub-pixel 202 and reading out the result for each pixel in the image sensor 107. Furthermore, the method of generating each signal is not limited to that described in the present embodiment, and for example, a second focus detection signal may be generated by subtracting a first focus detection signal from the image capture signal.

Although the pixel configuration of the image sensor 107 is described here as a configuration including the first photoelectric conversion unit 301 and the second photoelectric conversion unit 302 for each microlens 305, the configuration is not limited thereto. For example, pupil division may be performed using a configuration in which a light-blocking layer having an opening in a part thereof is provided between the microlens and the photoelectric conversion unit. Making the position of the opening in the light-blocking layer different for neighboring pixels makes it possible to obtain signals which correspond to the first photoelectric conversion unit 301 and the second photoelectric conversion unit 302.

Relationship Between Defocus Amount and Shift Amount

Figure 9:
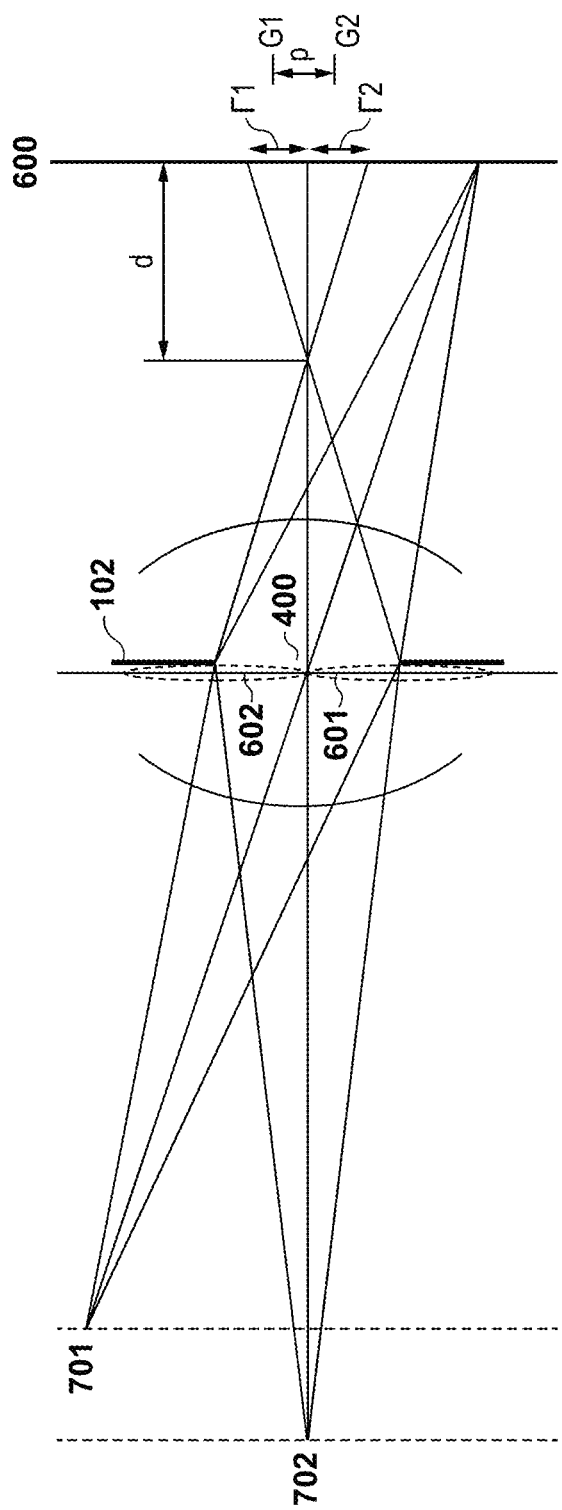
FIG. 9 is a diagram illustrating a relationship between a defocus amount and a shift amount according to the first embodiment.

A relationship between the shift amount between the first focus detection signal and the second focus detection signal and the defocus amount will be described next. FIG. 9 is a diagram illustrating a relationship between the defocus amount and the shift amount. The image sensor 107 is disposed in the image capturing plane 600, and as in FIGS. 4 and 6, the exit pupil 400 of the imaging optical system is divided in two, namely the partial pupil regions 601 and 602.

For a defocus amount d, a magnitude |d| thereof represents the distance from an image formation position of a subject image to the image capturing plane 600. Orientation is defined as a negative sign (d<0) in a forward focus state, where the image formation position of the subject image is further on the subject side than the image capturing plane 600, and as a positive sign (d>0) in a rearward focus state, which is the opposite. In an in-focus state, where the image formation position of the subject image is at the image capturing plane (i.e., an in-focus position), d=0. For example, an image of a subject 701 is formed at the in-focus position (d=0), and is therefore in the in-focus state. On the other hand, the image formation position of a subject 702 is further on the subject side than the image capturing plane 600 (d<0), and is therefore in a forward focus state. In the following, the forward focus state (d<0) and the rearward focus state (d>0) will be collectively referred to as a defocus state (|d|>0).

In the forward focus state (d<0), of the light flux received from the subject 702, the light flux that passes through the first partial pupil region 601 (or the second partial pupil region 602) spreads out to a width Γ1 (or Γ2) around a center of gravity position G1 (or G2) of the light flux after focusing. In this case, the image of the subject 702 on the image capturing plane 600 is blurred. The blurred image is received by the first sub-pixel 201 (or the second sub-pixel 202) constituting each pixel arranged in the image sensor 107, and the first focus detection signal (or the second focus detection signal) is generated.

Accordingly, the first focus detection signal (or the second focus detection signal) is stored in memory as image data of a subject image having a width Γ1 (or Γ2) at the center of gravity position G1 (or G2) on the image capturing plane 600 (i.e., a blurred image). The width Γ1 (or ΓΓ2) of the subject image increases roughly proportionally with an increase in the magnitude |d| of the defocus amount d. Likewise, assuming the shift amount between the first focus detection signal and the second focus detection signal is "p", a magnitude |p| of the shift amount increases with the magnitude |d| of the defocus amount d.

For example, as illustrated in FIG. 9, the shift amount p can be defined as a difference between the center of gravity positions of the light fluxes, i.e., G1–G2, and the magnitude |p| thereof increases roughly proportionally with the magnitude |d| of the defocus amount. Note that in the rearward focus state (d>0), the direction of image shift between the first focus detection signal and the second focus detection signal is opposite from that in the forward focus state, but the magnitude |p| of the defocus amount is proportional to the magnitude |d| of the defocus amount.

In this manner, the shift amount between the first focus detection signal and the second focus detection signal increases with the defocus amounts of the first focus detection signal and the second focus detection signal or the magnitude of the defocus amount of the image capture signal obtained by adding the first and second focus detection signals.

Accordingly, phase-detection AF can be realized by detecting the shift amount between the first focus detection signal and the second focus detection signal and converting the shift amount into a defocus amount. The shift amount between the first focus detection signal and the second focus detection signal can be found by calculating a correlation amount while shifting the first focus detection signal and the second focus detection signal relatively and obtaining a shift amount where there is a good correlation (matching between the signals).

The foregoing has described principles for realizing phase-detection AF by performing pupil division on the exit pupil of the imaging optical system into the first partial pupil region 601 and the second partial pupil region 602 using the first pupil intensity distribution 501 and the second pupil intensity distribution 502 in the image sensor 107. Note that in practice, the first partial pupil region 601 and the second partial pupil region 602 are affected by the pupil eccentricity amount of the sensor incident pupil of the image sensor 107, the incident pupil distance, and lens frame vignetting in the imaging optical system, and thus have more complex shapes.

A relationship between (a) the pupil eccentricity amount of the image sensor 107, the incident pupil distance, and lens frame vignetting of the imaging optical system and (b) the first partial pupil region 601 and the second partial pupil region 602 will be described next with reference to FIG. 10.

Pupil Eccentricity of Sensor Incident Pupil

Due to manufacturing error and the like, the sensor incident pupil of the image sensor 107 (the pupil intensity distributions 501 and 502) may have pupil eccentricity (eccentricity with respect to the optical axis of the pupil intensity distribution), and error may arise in the incident pupil distance.

Figure 10:
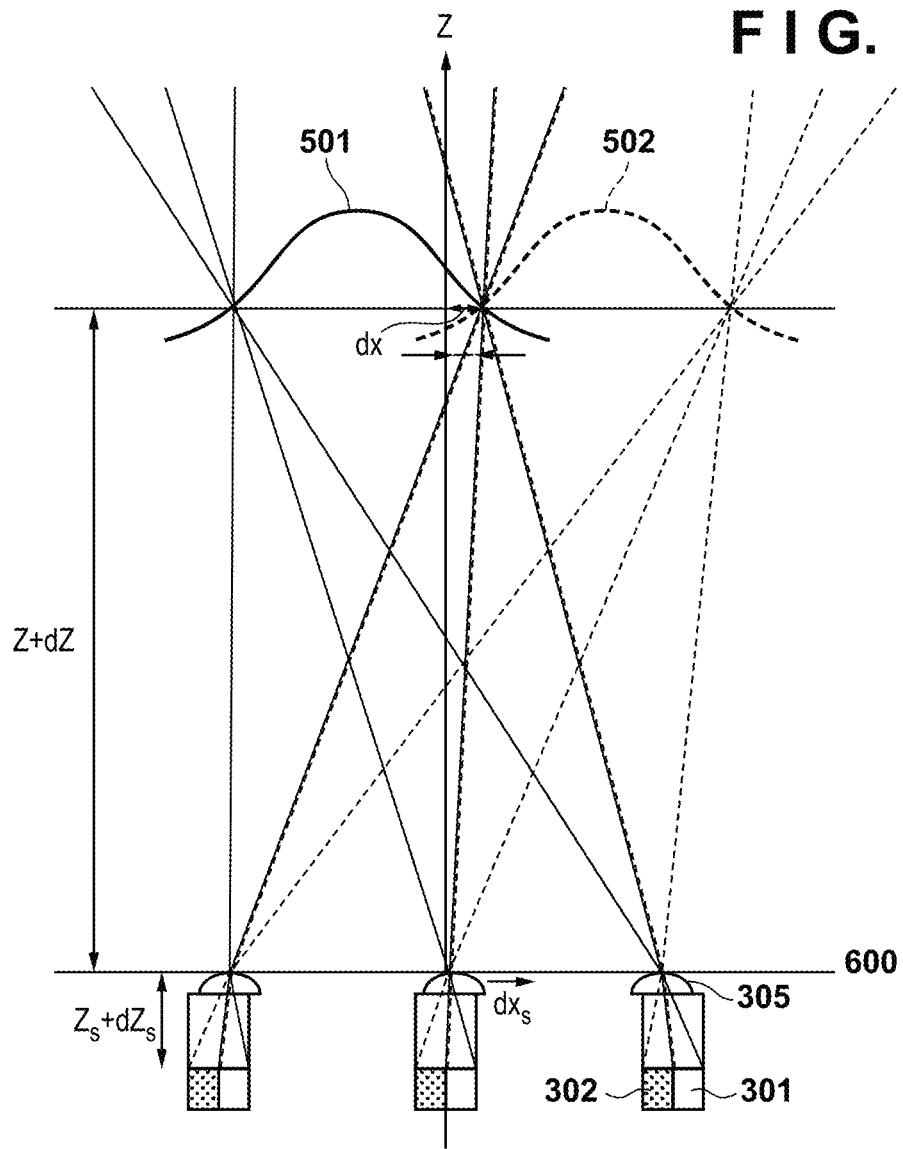
FIG. 10 is a diagram illustrating correspondence between the image sensor and the pupil intensity distribution when a pupil eccentricity amount, an incident pupil distance, and the like change, according to the first embodiment.

FIG. 10 illustrates a situation where the distance from the microlens 305 to the light receiving surfaces of the first photoelectric conversion unit 301 and the second photoelectric conversion unit 302, respectively, in all pixels of the image sensor 107, is, with respect to a design value zs, zs+dzs (error+dzs) due to manufacturing error and the like. As the distance zs becomes zs+dzs, the incident pupil distance of the image sensor 107 becomes, with respect to a design value Z, Z+dZ (error+dZ).

FIG. 10 also illustrates a state in which the microlens 305 is more eccentric (an eccentricity amount dxs) in the pupil division direction (the division direction of the photoelectric conversion unit) than the design value with respect to the first photoelectric conversion unit 301 and the second photoelectric conversion unit 302 in all pixels of the image sensor 107. Additionally, due to the optical axis position of the microlens 305 being eccentric by dxs from the design value, the incident pupil (pupil intensity distributions 501 and 502) of the image sensor 107 is eccentric (a pupil eccentricity amount dX) in the pupil division direction (the division direction of the photoelectric conversion unit).

Error in the incident pupil distance, pupil eccentricity, and the like may also arise due to assembly error and the like when attaching the image sensor 107 to the camera body. The pupil eccentricity amount dX and the incident pupil distance error+dZ have different magnitudes depending on the image height in the x direction and they direction due to errors occurring in each stage of the manufacturing process. In other words, the pupil eccentricity amount dX and the incident pupil distance error+dZ have image height dependence. Therefore, as will be described later, when calculating conversion coefficients for converting the shift amount to the defocus amount, taking the pupil eccentricity amount dX and the incident pupil distance Z+dZ, which are based on the image height, into account makes it possible to calculate the conversion coefficients with good accuracy.

Figure 11:
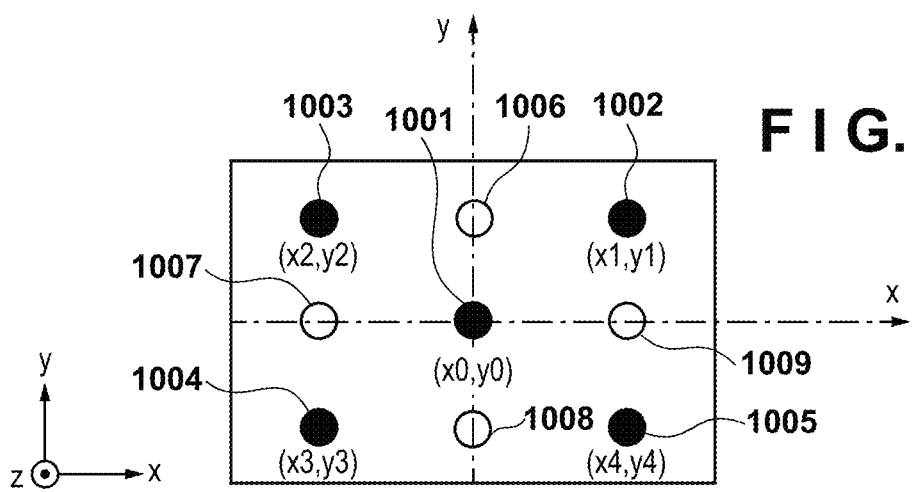
FIG. 11 is a diagram illustrating an image height position at which optical axis shift is measured when correcting for pupil eccentricity amount/incident pupil distance change dependent on the image height, according to the first embodiment.

Image Height Dependence of Pupil Eccentricity Amount and Incident Pupil Distance FIG. 11 illustrates an example of a method for efficiently holding information on the pupil eccentricity amount dX and the incident pupil distance Z+dZ corresponding to a plurality of image heights. FIG. 11 illustrates the pixel region of the image sensor 107, and information on the pupil eccentricity amount dX and the incident pupil distance error+dZ is held for positions 1001 to 1005, indicated by black circles. This information can be measured after manufacturing the camera body and held in the ROM 135, for example. The design value Z of the incident pupil distance is also held in the ROM 135.

When the pixel region is divided into four quadrants (top, bottom, left, and right) using an orthogonal coordinate system with the center of the pixel region as the origin, the pupil eccentricity amount dX and the incident pupil distance error+dZ have values that depend on the image height, and thus each quadrant indicates different optical characteristics.

Here, the image height is a value having a sign according to the direction, with the center of the image sensor 107 (image region) serving as the origin (image height=0).

Here, the pixel coordinates at position 100$n$ (n=1 to 5) are (xi,yi) (i=0 to 4). Also, position 1001 is assumed to be equal to the center of the image region. The optical characteristics of the image sensor 107 change basically continuously as the image height changes. Therefore, by storing the information on the pupil eccentricity amount dX and the incident pupil distance error+dZ for one or more discrete positions for each quadrant, the pupil eccentricity amount dX and the incident pupil distance error+dZ at each pixel can be obtained through an interpolation calculation. Hereinafter, the information on the pupil eccentricity amount dX and the incident pupil distance error+dZ will be collectively referred to as "error information".

FIG. 11 illustrates an example in which positions 1002 to 1005 are arranged to be point-symmetrical with respect to the center of the pixel region (position 1001) as well as symmetrical across the coordinate axes. In this case, x1=x4, y1=y2, x2=x3, and y3=y4. Two or more positions satisfying the same conditions may be provided in each quadrant.

An example of calculating the error information through interpolation will be described. The pupil eccentricity amount dX(x,y) and the incident pupil distance error+dZ(x, y) pertaining to the pixel coordinates (x,y) in a second quadrant (upper-left) can be calculated as follows.

First, the error information of position 1006 (x0,(y1+y2)/2) is calculated by linearly interpolating the error information of position 1002 and position 1003.

Next, the error information of position 1007 ((x2+x3)/2.0) is calculated by linearly interpolating the error information of position 1003 and position 1004.

The error information at the pixel coordinates contained in a rectangular region having positions 1001, 1006, 1003, and 1007 as vertices can be calculated by two-dimensional linear interpolation (bilinear interpolation) of the error information in positions 1001, 1006, 1003, and 1007.

By performing the calculation for the pixel coordinates included in the other quadrants in the same manner, the error information at the pixel coordinates included in a rectangular region having positions 1002 to 1005 as vertices can be calculated.

Note that if the simplicity of the calculation is to be prioritized over the accuracy of the correction, the error information at the pixel coordinates in the rectangular region having positions 1002 to 1005 as vertices may be calculated through two-dimensional linear interpolation (bilinear interpolation) of the error information at positions 1002 to 1005. In this case, the error information at position 1001 is not used.

On the other hand, the error information at the pixel coordinates of each quadrant not included in the rectangular region having positions 1002 to 1005 as vertices can be calculated by extrapolating the error information at the pixel coordinates included in the rectangular region having positions 1002 to 1005 as vertices. Alternatively, the error information at the nearest pixel coordinate among the pixel coordinates included in the rectangular region having positions 1002 to 1005 as vertices, or the error information at the nearest pixel coordinate among positions 1002 to 1005, may be used.

The calculation of the conversion coefficient taking into account the error information will be described next. The conversion coefficient is used to convert the shift amount in the focus detection signal into a defocus amount. Here, a conversion coefficient K[dX(x,y), Z+dZ(x,y)], which takes into account the pupil eccentricity amount dX(x,y) and the incident pupil distance error+dZ(x,y) at pixel coordinates (x,y), is calculated. Using such a conversion coefficient makes it possible to perform highly accurate focus detection for focus detection regions located at various image heights.

The optical design of the image sensor 107 is basically based on the image height at the center position. Accordingly, if the error information is held for one or more pixel coordinates in each quadrant in addition to the center position (x0,y0), a conversion coefficient having good accuracy can be calculated. A specific method for calculating the conversion coefficient will be described later.

Note that a case where the conversion coefficient is calculated after obtaining the error information at pixel coordinates (x,y) is described here. However, a conversion coefficient reflecting the error information may be calculated and stored for positions 1001 to 1005, and the conversion coefficient at any desired pixel coordinate may then be obtained in the same way as the error information. The incident pupil distance Z+dZ containing error for positions 1001 to 1005 may be stored instead of storing the incident pupil distance error+dZ for positions 1001 to 1005 and the design value z of the incident pupil distance.

The positions 1001 to 1005 illustrated in FIG. 11 as the positions for storing the error information are merely examples. The image height of the pixel coordinate that holds the error information in each quadrant may be different from that in FIG. 11, the error information may be held for a plurality of pixel coordinates having different image heights in each quadrant, and so on.

Note that the models of the pupil eccentricity amount and the incident pupil distance in the foregoing descriptions are merely examples. The present invention may use any model to represent the pupil eccentricity amount and the incident pupil distance, as long as the model makes it possible to calculate the pupil eccentricity amount and/or the incident pupil distance, which vary according to the image height, for any given pixel coordinate.

Lens Frame Vignetting

Next, vignetting caused by the lens frame for pixels in the peripheral region of the pixel region (a region having a large image height) will be described with reference to FIGS. 12 and 13. "Lens frame" refers to a frame-shaped member that holds the lens constituting the imaging optical system.

Figure 12:
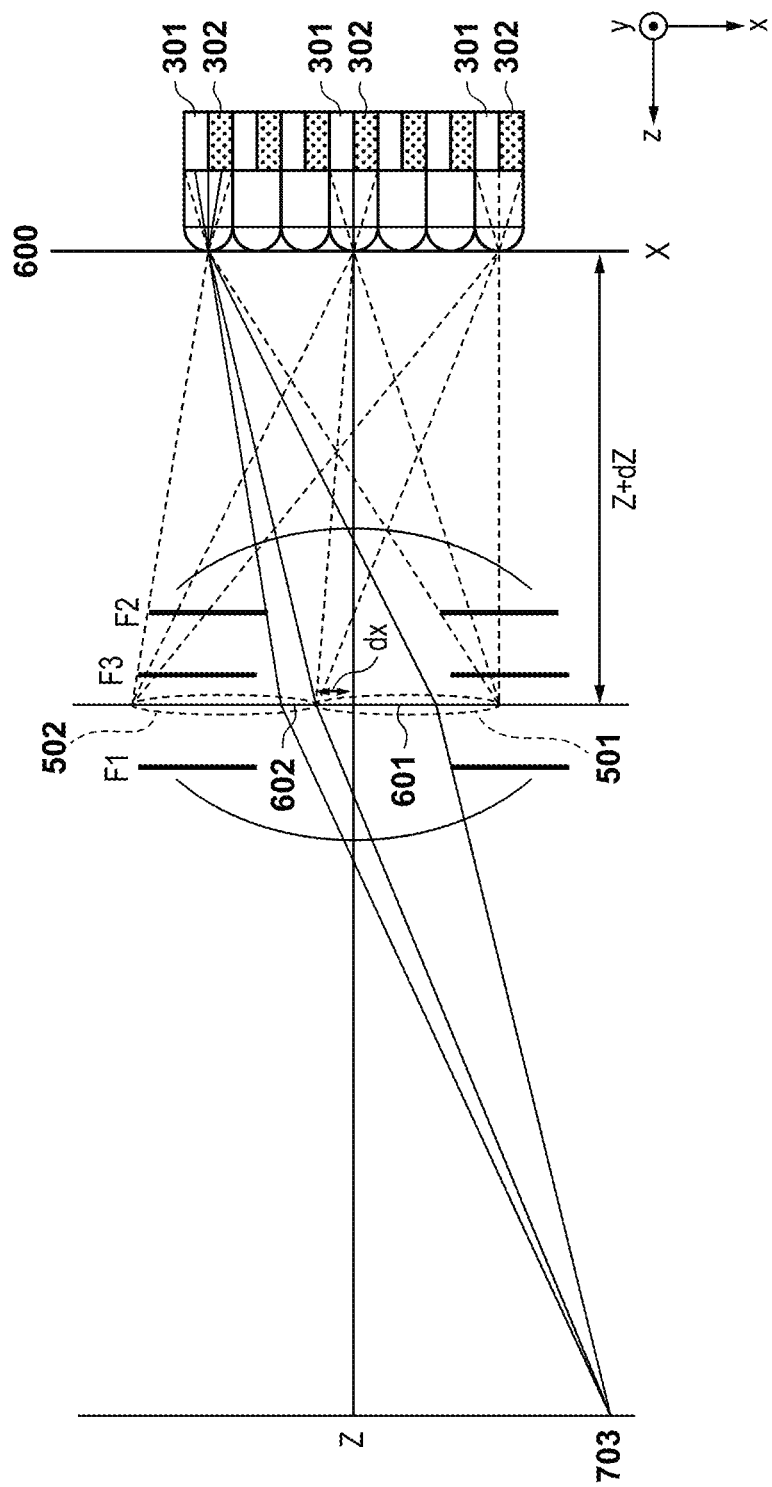
FIG. 12 is a diagram illustrating a relationship between (a) a sensor incident pupil, the pupil eccentricity amount, and the incident pupil distance of the image sensor, (b) lens frame vignetting of the imaging optical system, and (c) the partial pupil region, according to the first embodiment.

FIG. 12 illustrates a relationship between (a) the pupil eccentricity amount of the sensor incident pupil of the image sensor 107, the incident pupil distance, and the lens frame vignetting of the imaging optical system and (b) the partial pupil region (the first partial pupil region 601 and the second partial pupil region 602) in a pixel in the peripheral region, in the xz plane, viewed from the +y side. The incident pupil (the pupil intensity distributions 501 and 502) of the image sensor 107 corresponds to FIG. 10, and is assumed to be eccentric in the pupil division direction (the division direction of the photoelectric conversion unit) by the pupil eccentricity amount dX at a pupil plane at the incident pupil distance Z+dZ.

A light flux from a subject 703 reaches the image capturing plane 600 with the incident angle thereof limited by a first frame F1 on the subject side of the imaging optical system, a third frame F3, which is the aperture stop 102 of the imaging optical system, and a second frame F2 on the image side of the imaging optical system, respectively. Of the light flux that enters the imaging optical system from the subject 703, the light flux that is blocked (vignetted) by the first to third frames F1 to F3 and cannot reach the image capturing plane 600 is greater in the pixels in the peripheral region.

Of the light flux vignetted by the first to third frames F1 to F3 of the imaging optical system, the light flux passing through the first partial pupil region 601, which is an overlapping region with the pupil intensity distribution 501, is received by the first sub-pixel 201 (the first photoelectric conversion unit 301). Likewise, of the light flux vignetted by the first to third frames F1 to F3 of the imaging optical system, the light flux passing through the second partial pupil region 602, which is an overlapping region with the pupil intensity distribution 502, is received by the second sub-pixel 202 (the second photoelectric conversion unit 302).

Although the first to third frames F1 to F3 are described in the present embodiment as frame members having concentric circular openings centered on the optical axis, at least some of the openings need not be formed by circular arcs. For example, the frames may be polygonal openings, D-shaped openings, or the like.

Figure 13:
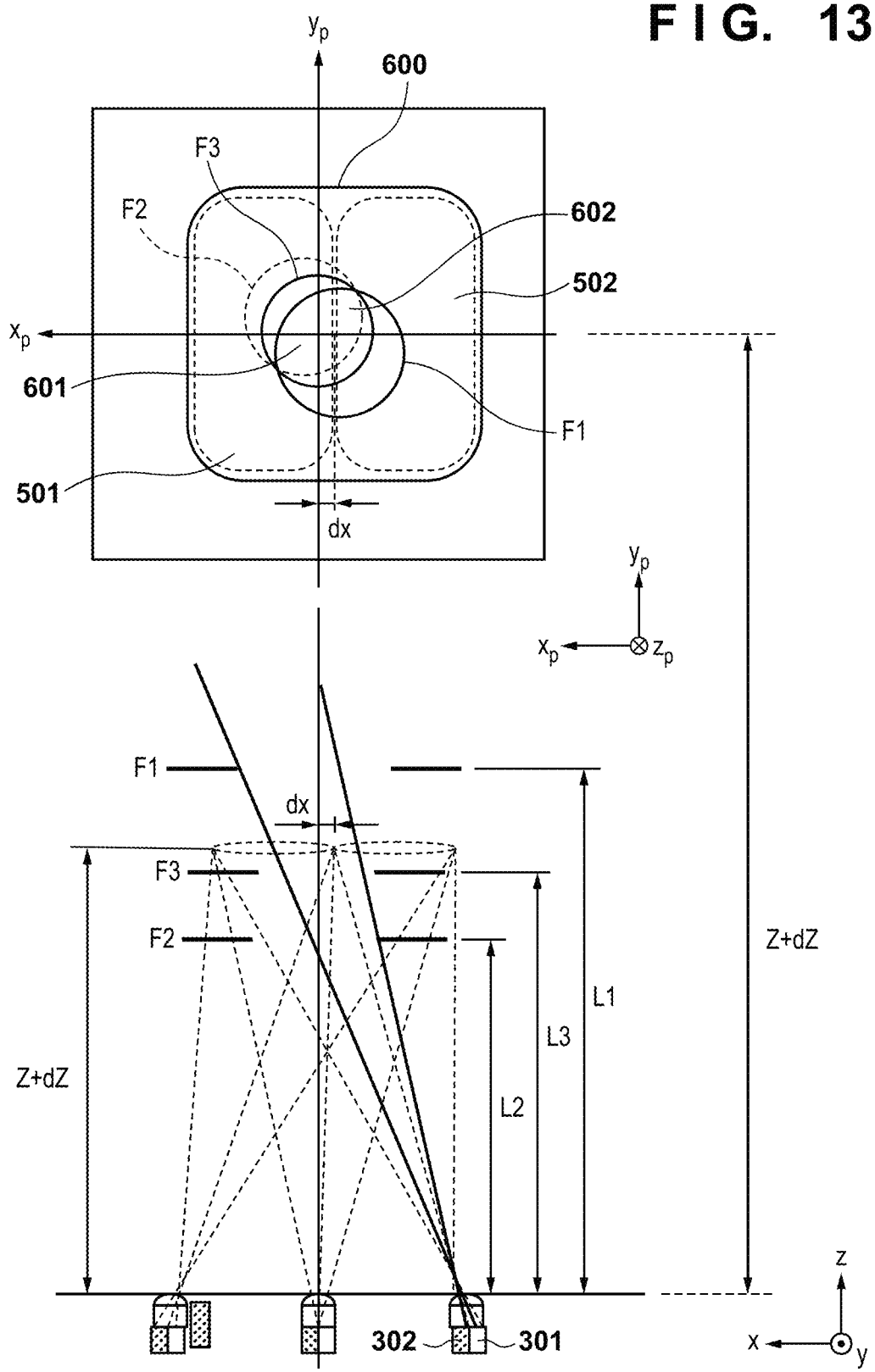
FIG. 13 is a diagram illustrating a relationship between (a) the sensor incident pupil, the pupil eccentricity amount, and the incident pupil distance of the image sensor, (b) lens frame vignetting of the imaging optical system, and (c) the partial pupil region, according to the first embodiment.

FIG. 13 illustrates the first partial pupil region 601 and the second partial pupil region 602 in the pupil plane located at the incident pupil distance Z+dZ of the image sensor 107. The exit pupil overlapping with the openings in the first to third frames F1 to F3 of the imaging optical system is divided into the first partial pupil region 601 and the second partial pupil region 602 by the sensor incident pupil (the first pupil intensity distribution 501 and the second pupil intensity distribution 502) of the image sensor 107. The shapes of the first partial pupil region 601 and the second partial pupil region 602 are affected by the shapes of the openings in the first to third frames F1 to F3, the positions of the frames in the z direction, the image height at the pixels, the error information (the pupil eccentricity amount dX and the incident pupil distance error+dZ(x,y)), and the like.

Defocus Amount Calculation Processing

Processing for calculating the defocus amount, performed by the CPU 121 executing a focus detection program, will be described next with reference to the flowchart in FIG. 14. The focus detection program may be stored in the ROM 135, or recorded in the storage medium 133.

Although the CPU 121 of the image capture apparatus 100 executes the focus detection processing in the present embodiment, a personal computer (PC), a dedicated device, or the like may also execute the focus detection processing as the focus detection device. The focus detection processing described below may also be performed using hardware circuits such as ASICs, FPGAs, or the like.

In step S101, the CPU 121 sets the focus detection position. The focus detection position may be the coordinates of the pixel closest to the center or the center of gravity, for example, of the focus detection region. Here, the focus detection position is set at coordinates $(x_{AF}, y_{AF})$ of an orthogonal coordinate system with the center or center of gravity of the pixel region of the image sensor 107 serving as the origin. The focus detection region is, for example, a rectangular region. The focus detection region can be determined by any publicly-known method.

Note that the center or the center of gravity of the pixel region substantially coincides with the optical axis of the imaging optical system. However, strictly speaking, there is a certain amount of variation between the positions of the image sensor 107 and the imaging optical system. Accordingly, the origin position may be determined by taking into account the range of variation. Additionally, the coordinates of the focus detection position may be set by taking into account a shift amount of the optical axis position produced by an optical image stabilization mechanism.

Next, from the coordinates $(x_{AF}, y_{AF})$, an image height $r_{AF}$ at the focus detection position is calculated through Formula (6).

$$r_{AF}\sqrt{x_{AF}^2+y_{AF}^2} \quad (6)$$

In step S102, the CPU 121 (the lens information obtainment unit 121d) obtains the lens information according to the optical conditions. Specifically, the coordinates $(x_{AF}, y_{AF})$ of the focus detection position and the lens information according to the optical conditions of the imaging optical system (interchangeable lens), such as the focus state FS, the zoom state ZS, and the like, are obtained. The lens information includes a center $C1(x_{AF}, y_{AF}, FS, ZS)$ and a radius $R1(x_{AF}, y_{AF}, FS, ZS)$ of the first frame on the object side (object side frame) F1 of the imaging optical system, which are projected onto the pupil plane at a position that is a predetermined pupil distance $Z_f$ away from the image formation plane of the imaging optical system (the image capturing plane of the image sensor 107). Furthermore, the frame information is constituted by a center $C2(x_{AF}, y_{AF}, FS, ZS)$ and a radius $R2(x_{AF}, y_{AF}, FS, ZS)$ of the second frame on the image side (image side frame) F2 of the imaging optical system.

Additionally, the lens information is constituted by the aperture value $F(x_{AF}, y_{AF}, FS, ZS)$ of the imaging optical system and the exit pupil distance $LPO(x_{AF}, y_{AF}, FS, ZS)$ of the aperture frame. The lens information is stored in advance in non-volatile memory or the like provided in the imaging optical system, and the CPU 121 (the lens information obtainment unit 121d) can obtain the lens information by communicating with the imaging optical system through the lens communication circuit 130. Lens information corresponding to the attached interchangeable lens may be used from the lens information stored in advance in the ROM 135 of the image capture apparatus 100. The lens information can be obtained at any desired timing, but typically is obtained when the lens is changed and the image capture apparatus 100 starts up.

The lens information may also be obtained from an external device, over a network, for example. The optical conditions may also include information other than the focus state FS and the zoom state ZS. For example, the optical conditions may include the status of an extender attachment, the amount of tilt or shift, the status of various optical filter attachments, and the like.

In step S102, the CPU 121 then calculates a center $C3(x_{AF}, y_{AF}, FS, ZS)$ of the third frame F3 of the imaging optical system, projected to the pupil coordinates at the predetermined pupil distance $Z_f$, from the image height $r_{AF}$ at the focus detection position and the exit pupil distance LPO of the aperture frame of the imaging optical system, through Formula (7).

$$C3(x_{AF}, y_{AF}, FS, ZS) = r_{AF}\left(1 - \frac{Z_f}{LPO(x_{AF}, y_{AF}, FS, ZS)}\right) \quad (7)$$

The CPU 121 also calculates a radius R3 $(x_{AF}, y_{AF}, FS, ZS)$ of the third frame F3 of the imaging optical system, projected to the pupil coordinates at the predetermined pupil distance $Z_f$, from the image height $r_{AF}$ at the focus detection position and the aperture value F of the imaging optical system, through Formula (8).

$$R3(x_{AF}, y_{AF}, FS, ZS) = \frac{Z_f}{\sqrt{4F^2 - 1}} \quad (8)$$

Figure 15:
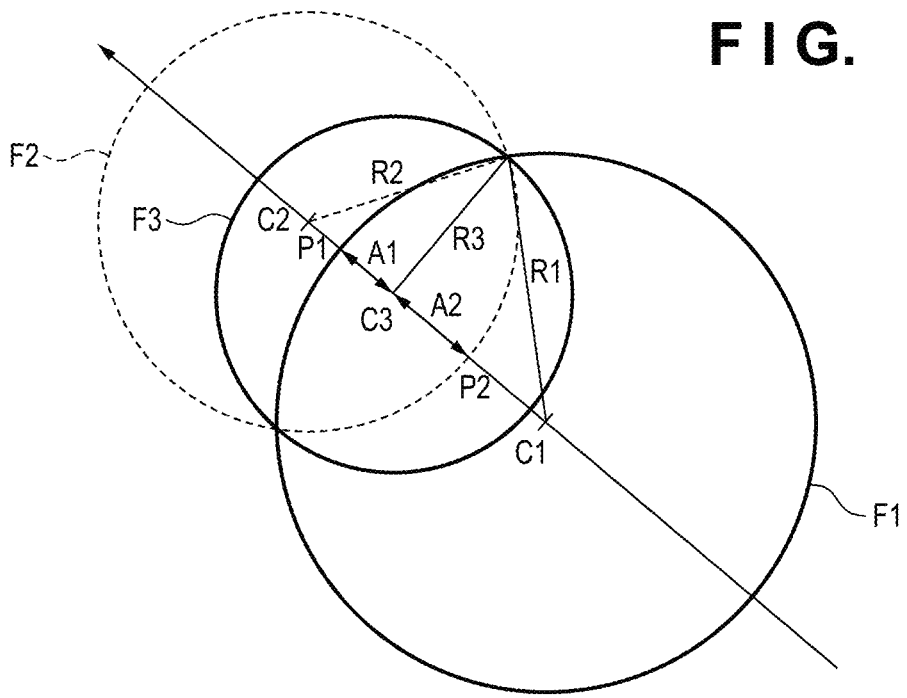
FIG. 15 is a diagram illustrating a relationship for lens frame vignetting in the imaging optical system according to the first embodiment.

Furthermore, the CPU 121 calculates a first aperture parameter a1 and a second aperture parameter a2 based on the lens information. The first aperture parameter a1 and the second aperture parameter a2 are parameters pertaining to vignetting caused by the lens frame. FIG. 15 illustrates an example of the exit pupil, which is the overlap of the opening parts of the first to third frames F1 to F3 of the imaging optical system, at the pupil plane located the predetermined pupil distance $Z_f$ from the image formation plane of the imaging optical system (the image capturing plane of the image sensor 107). The straight line passing through the opening parts from the centers C1 to C3 represents the optical axis.

The first aperture parameter a1 (0≤a1≤1) is a value of a distance A1 from the center C3 of the opening part of the third frame F3 to a vertex P1 of the first frame F1, normalized by the radius R3 of the third frame. Here, the vertex P1 is the point on the circumference where the distance from the center C3 is the shortest when the opening of the first frame F1 is a circle. Likewise, the second aperture parameter a2 (0≤a2≤1) is a value of a distance A2 from the center C3 of the opening part of the third frame F3 to a vertex P2 of the second frame, normalized by the radius R3 of the third frame. The first aperture parameter a1 is calculated through Formula (9A), and the second aperture parameter a2 is calculated through Formula (9B).

$$a1 = \frac{R1 - |C1 - C3|}{R3} \quad (9A)$$

$$a2 = \frac{R2 - |C2 - C3|}{R3} \quad (9B)$$

In step S103, the CPU 121 (the pixel signal obtainment unit 121a) acquires the focus detection signal from the image sensor 107. Specifically, for each pixel 200 of the image sensor 107, the CPU 121 acquires the pixel signal obtained by the first sub-pixel 201 (A image signal) and the pixel signal obtained by the second sub-pixel 202 (B image signal). As mentioned above, each of these signals may be read out from a sub-pixel, or one may be read from a sub-pixel and the other obtained by subtracting the A image signal or the B image signal from the image capture signal (an A+B image signal). Note that a focus detection signal which has been captured by the image sensor 107 in advance and stored in the storage medium may be obtained as well.

Furthermore, the CPU 121 (the signal generation unit 121b) generates the first focus detection signal according to the first partial pupil region 601 and the second focus detection signal according to the second partial pupil region 602, which are different in the imaging optical system, based on the obtained pixel signals. In other words, each focus detection signal is generated based on the signals from pixels corresponding to the same partial pupil region.

Assume that a pixel is divided into Nx sub-pixels in the horizontal direction and Ny sub-pixels in the vertical direction, and a sub-pixel signal group obtained from one pixel is LF (for total number Nx×Ny=$N_{LF}$). Among the sub-pixel signal group LF, a signal obtained from the iS-th (1≤iS≤Nx) sub-pixel in the column direction and the jS-th (1≤jS≤Ny) sub-pixel in the row direction is set as a kth focus detection signal, assuming k=Nx(jS−1)+iS (1≤k≤$N_{LF}$). The kth focus detection signal Ik(j,i), which corresponds to the kth pupil region of the imaging optical system and is the ith in the column direction and jth in the row direction, is generated through the following Formula (10).

$$I_k(j,i) = I_{N_x(j_S - 1) + i_S}(j,i) = LF(N_y(j-1) + j_S, N_x(i-1) + i_S) \quad (10)$$

The present embodiment describes an example where Nx=2, Ny=1, $N_{LF}$=2, each pixel is divided into two sub-pixels in the x direction, and the first focus detection signal and the second focus detection signal are generated. The signal of the first sub-pixel 201 for each pixel is selected from the pixels arranged as illustrated in FIG. 2. This generates a first focus detection signal I1(j,i), which is a Bayer array RGB signal having a resolution of a pixel number N(=the horizontal pixel number $N_H$×the vertical pixel number $N_V$), and corresponds to the first partial pupil region 601 of the imaging optical system. Likewise, by selecting the signal of the second sub-pixel 202, a second focus detection signal I2(j,i) corresponding to the second partial pupil region 602 of the imaging optical system is generated.

In step S103, functioning as generation means, the CPU 121 (the signal generation unit 121b) generates a kth focus detection luminance signal Yk(i,j) (k=1,2) from the kth focus detection signal Ik (k=1,2), which is a Bayer array RGB signal. Specifically, the CPU 121 (the signal generation unit 121b) generates the kth focus detection luminance signal Yk(i,j) (k=1,2) for each position (j,i) by aligning the color center of gravity of each RGB color through the following Formula (11).

$$Y_k(j,i) = \begin{pmatrix} I_k(j-1,i-1) & I_k(j-1,i) & I_k(j-1,i+1) \\ I_k(j,i-1) & I_k(j,i) & I_k(j,i+1) \\ I_k(j+1,i-1) & I_k(j+1,i) & I_k(j+1,i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix} \quad (11)$$

In this case, in order to improve the accuracy of focus detection, light amount correction processing and the like, which correct the shading produced by the pupil division, can be applied to the kth focus detection luminance signal Yk. Shading caused by pupil division is also affected by the pupil eccentricity amount, the incident pupil distance, and the aperture frame of the imaging optical system, as well as the conversion coefficient. As such, the light amount correction values used in the light amount correction processing may have part of the calculation processing executed by an external device, with the results thereof (intermediate values) held in the ROM 135. Applying part of the calculation processing in advance and externally makes it possible to lighten the load on the CPU 121 involved in calculating the light amount correction values.

Here, a light amount correction value SHD is calculated in advance, and stored in the ROM 135, for each of a plurality of image heights, taking into account the effects of the pupil eccentricity amount, the incident pupil distance, and the aperture frame of the imaging optical system. The CPU 121 (the signal generation unit 121b) corrects the light amount by obtaining the appropriate light amount correction value SHD from the ROM 135 according to the lens information and the focus detection position, and applying that value to the kth focus detection luminance signal Yk as indicated by Formula (12).

$$Y_k = (j,i) = SHD_k(j,i) \cdot Y_k(j,i) \quad (12)$$

In addition, the CPU 121 (the signal generation unit 121b) applies one-dimensional band pass filter processing to each kth focus detection luminance signal Yk (k=1,2) in the pupil division direction (the column direction). Through this, the CPU 121 (the signal generation unit 121b) generates a first focus detection signal dYA and a second focus detection signal dYB, which are approximately limited to the components of a wavenumber kAF.

For example, a first-order differential type filter [1,5,8,8, 8,8,5,1,−1,−5,−8,−8,−8,−8,−5,−1] can be used as the one-dimensional band pass filter applied here. If necessary, the pass band of the one-dimensional band pass filter can be adjusted. In general, in phase-detection AF, the filter is configured such that the pass band thereof includes a low-frequency region in order to detect the focus in a high defocus state. However, when focus detection is performed from a high defocus state to a low defocus state, the pass band of the filter may be adjusted to be on the higher frequency side according to the defocus state.

In step S104, functioning as shift amount calculation means, the CPU 121 (the focus detection unit 121c) calculates the shift amount based on the first focus detection signal dYA and the second focus detection signal dYB. Assume that $dYA(j_{AF}+j2,i_{AF}+i2)$ is the first focus detection signal limited to substantially the wavenumber kAF component in the j2-th ($-n2 \leq j2 \leq n2$) row direction and the i2-th ($-m2 \leq i2 \leq m2$) column direction, which is the pupil division direction, centered on a focus detection position $(j_{AF},i_{AF})$. Furthermore, assume the second focus detection signal is $dYB(j_{AF}+j2,i_{AF}+i2)$. Assuming that the shift amount is s ($-ns \leq s \leq ns$), a correlation amount $COR_{EVEN}$ $(j_{AF},i_{AF},s)$ at each position $(j_{AF},i_{AF})$ is calculated through Formula (13A), and a correlation amount $COR_{ODD}$ $(j_{AF},i_{AF},s)$ is calculated through Formula (13B). The correlation amounts obtained here indicate that the smaller the value, the higher the correlation.

$$COR_{even}(j_{AF}, i_{AF}, s) = \sum_{j_2=-n_2}^{n_2} \sum_{i_2=-m_2}^{n_2} |dYA(j_{AF} + j_2) - dYB(j_{AF} + j_2, i_{AF} + j_2 - s)| \quad (13A)$$

$$COR_{odd}(j_{AF}, i_{AF}, s) = \sum_{j_2=-n_2}^{n_2} \sum_{i_2=-m_2}^{n_2} |dYA(j_{AF} + j_2) - dYB(j_{AF} + j_2, i_{AF} + j_2 - s)| \quad (13B)$$

The correlation amount $COR_{ODD}$ $(j_{AF},i_{AF},s)$ is the correlation amount when the shift amount is shifted by a half-phase-1 shift relative to the shift amount for which the correlation amount $COR_{EVEN}$ $(j_{AF},i_{AF},s)$ is calculated.

Next, in step S104, an average value is calculated by calculating the shift amount of a real value where the correlation amount becomes a minimum value from the correlation amount $COR_{EVEN}$ $(j_{AF},i_{AF},s)$ and the correlation amount $COR_{ODD}$ $(j_{AF},i_{AF},s)$, respectively, through sub-pixel calculation. Then, a shift amount $q_{det}$ at the focus detection position $(j_{AF},i_{AF})$ is calculated.

Conversion Coefficient Calculation

In step S105, functioning as coefficient calculation means, the CPU 121 (the focus detection unit 121c) calculates the conversion coefficient K for converting the shift amount $q_{det}$ obtained in step S104 into a defocus amount $d_{def}$. The method for calculating the conversion coefficient K will be described in detail with reference to the flowchart in FIG. 16. The following descriptions assume that the processing in each step is executed by the CPU 121 (the focus detection unit 121c). However, part of the calculation processing may be executed by an external device and the results (intermediate values) may be held in the ROM 135. Applying part of the calculation processing in advance and externally makes it possible to lighten the load on the CPU 121 involved in calculating the conversion coefficient K.

In step S201, the CPU 121 (the focus detection unit 121c) sets a virtual defocus amount $d_{vir}$. The virtual defocus amount $d_{vir}$ is a virtual defocus amount set to determine the conversion coefficient K. For example, the CPU 121 sets the virtual defocus amount $d_{vir}$ to a predetermined defocus amount at which the subject can be sufficiently blurred. The virtual defocus amount $d_{vir}$ can be in the forward focus state ($d_{vir}<0$) or the rearward focus state ($d_{vir}>0$).

A plurality of the virtual defocus amounts $d_{vir}$ may be set as well. As described later, the conversion coefficient K is calculated as the ratio of the virtual defocus amount $d_{vir}$ and the shift amount $q_{det}$, which are in a substantially linear relationship. In other words, the conversion coefficient K corresponds to the slope of a straight line representing the relationship between the virtual defocus amount $d_{vir}$ and the shift amount $q_{det}$ in an orthogonal coordinate system that takes the horizontal axis as the virtual defocus amount $d_{vir}$ and the vertical axis as the shift amount $q_{det}$. Accordingly, the conversion coefficient K can be calculated accurately by setting the virtual defocus amount $d_{vir}$ for both the forward focus state and the rearward focus state.

In step S202, the CPU 121 (the focus detection unit 121c) generates the following:

the sensor incident pupil of the image sensor 107 (the first pupil intensity distribution 501 and the second pupil intensity distribution 502)

the pupil eccentricity amount dX $(x_{AF},y_{AF})$ for each individual image sensor 107 and each of the coordinates $(x_{AF},y_{AF})$ of the focus detection position the incident pupil distance Z+dZ $(x_{AF},y_{AF})$ for each individual image sensor 107 and each of the coordinates $(x_{AF},y_{AF})$ of the focus detection position Furthermore, the CPU 121 (the focus detection unit 121c) generates the following:

a first virtual focus detection signal $VI_1$ (j,i|$d_{vir}$,dX($X_{AF},y_{AF}$),Z+dZ($x_{AF},y_{AF}$),$X_{AF},y_{AF}$,F,LPO,a1,a2)

a second virtual focus detection signal $VI_2$(j,i|$d_{vir}$,dX($x_{AF},y_{AF}$),Z+dZ($X_{AF},y_{AF}$),$X_{AF},y_{AF}$,F,LPO,a1, a2)

The first virtual focus detection signal $VI_1$ and the second virtual focus detection signal $VI_2$ correspond to the following:

the virtual defocus amount $d_{vir}$ the sensor incident pupil of the image sensor 107 (the first pupil intensity distribution 501 and the second pupil intensity distribution 502)

the coordinates $(x_{AF},y_{AF})$ of the focus detection position the pupil eccentricity amount dX $(x_{AF},y_{AF})$ for each individual image sensor 107 and each of the coordinates $(x_{AF},y_{AF})$ of the focus detection position the incident pupil distance Z+dZ $(x_{AF},y_{AF})$ for each individual image sensor 107 and each of the coordinates $(x_{AF},y_{AF})$ of the focus detection position frame information of the imaging optical system (the aperture value F, the exit pupil distance LPO of the aperture frame, the first aperture parameter a1, the second aperture parameter a2)

Note that the frame information of the imaging optical system is not limited to that described here.

Of these parameters, the following can vary from one individual image sensor 107 to another.

the sensor incident pupil of the image sensor 107 (the first pupil intensity distribution 501 and the second pupil intensity distribution 502)

the pupil eccentricity amount dX (x,y) for each individual image sensor 107 and each of the coordinates of the focus detection position the incident pupil distance Z+dZ (x,y) for each individual image sensor 107 and each of the coordinates of the focus detection position These parameters, which can vary from one individual image sensor 107 to another, can be measured, for example, when manufacturing the image sensor 107, and stored as adjustable values or fixed values in non-volatile memory provided in the image sensor 107.

On the other hand, the coordinates $(x_{AF}, y_{AF})$ of the focus detection position are determined each time the image is captured by the CPU 121, based on a user operation or without a user operation. Accordingly, the coordinates $(x_{AF}, y_{AF})$ of the focus detection position are obtained during the processing for calculating the conversion coefficient K.

Furthermore, the frame information of the imaging optical system (the aperture value F and the exit pupil distance LPO of the aperture frame) can also change with each image capture. The first aperture parameter a1 and the second aperture parameter a2 depend on the position of the frame of the imaging optical system, as indicated by Formulas (9a) and (9b), and can therefore change with each image capture. The CPU 121 (the lens information obtainment unit 121d) can obtain these parameters pertaining to the state of the imaging optical system by communicating with the imaging optical system (the interchangeable lens) through the lens communication circuit 130. By obtaining parameters from the imaging optical system as necessary, the conversion coefficient K can be calculated with better accuracy, using parameters that correspond to the image capturing conditions, such as the aperture value, the focal length, and the like. Note that other items may be included in the image capturing conditions.

The parameters of the conversion coefficient K $(dX(x_{AF}, y_{AF}), Z+dZ(x_{AF}, y_{AF}), x_{AF}, y_{AF}, F, LPO)$, as well as the values of the centers C1 and C2 and the radii R1 and R2 of the first and second frames of the imaging optical system, are necessary to calculate the conversion coefficient K. In the present embodiment, the first aperture parameter a1 and the second aperture parameter a2, which indicate the percentage of lens frame vignetting, can be used to suppress the total number of parameters required to calculate the conversion coefficient K.

Figure 17:
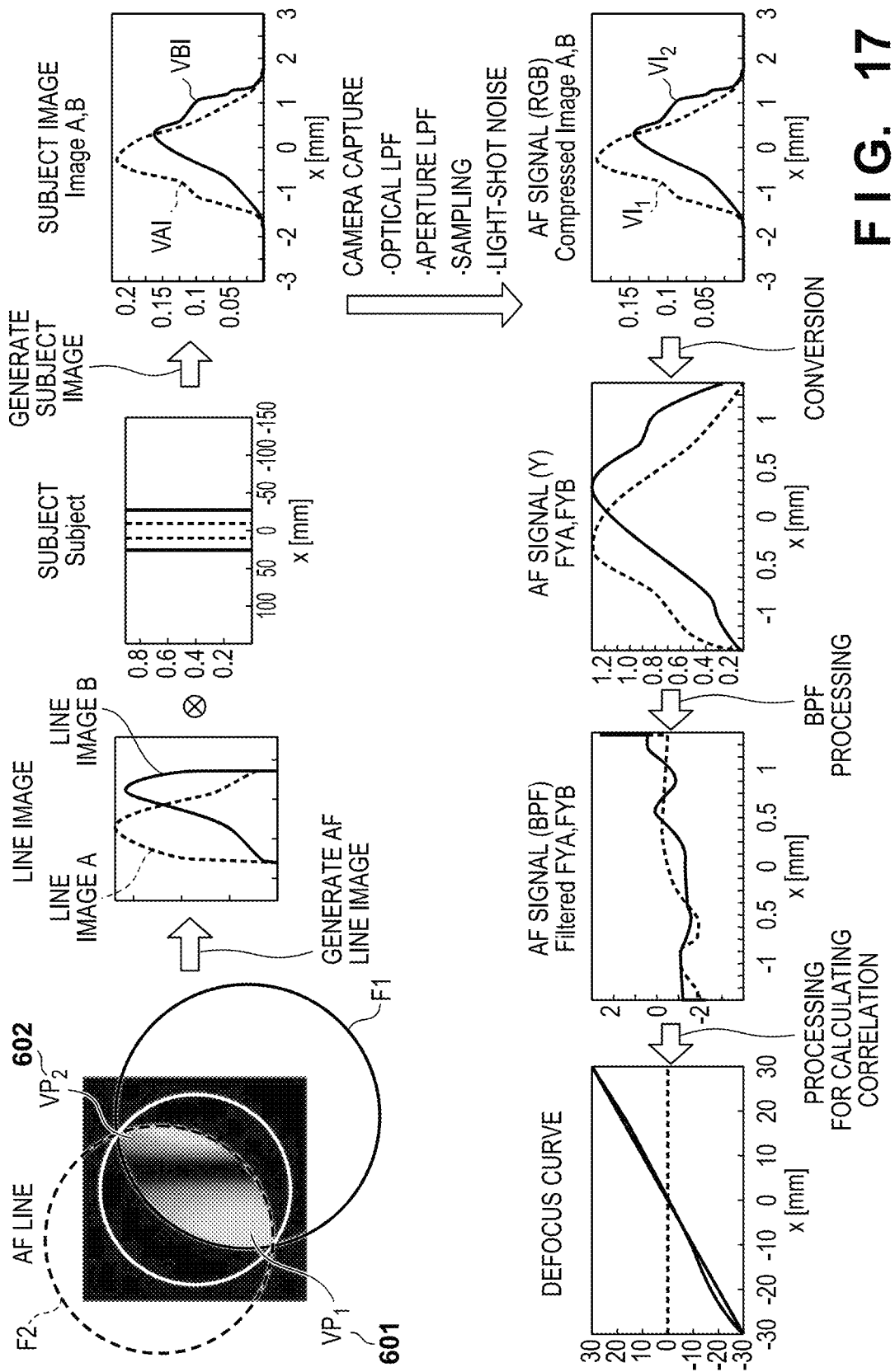
FIG. 17 is a diagram illustrating a method for generating a virtual focus detection signal according to the first embodiment.

FIG. 17 schematically illustrates a method for generating the first virtual focus detection signal VI'₁ and the second virtual focus detection signal VI'₂. First, the CPU 121 (the signal generation unit 121b) obtains the following:

the first pupil intensity distribution 501 and the second pupil intensity distribution 502 of the image sensor 107 the coordinates $(x_{AF}, y_{AF})$ of the focus detection position the pupil eccentricity amount $dX(x_{AF}, y_{AF})$ of the focus detection position the incident pupil distance $Z+dZ(x_{AF}, y_{AF})$ of the focus detection position the aperture value F of the imaging optical system the exit pupil distance LPO of the aperture frame of the imaging optical system the first aperture parameter a1 (0≤a1≤1) and the second aperture parameter a2 (0≤a2≤1)

Of these parameters, the CPU 121 (the signal generation unit 121b) can obtain the values which do not depend on the image capturing conditions from values stored in the ROM 135 in advance, when the processing of calculating the conversion coefficient K is started, or the like, store the values in the RAM 136, and use the values. The values based on the image capturing conditions can be obtained by the CPU 121 (the signal generation unit 121b) at the start of the processing of calculating the conversion coefficient K, stored in the RAM 136, and used.

Next, the CPU 121 (the signal generation unit 121b) calculates the center C3 of the third frame (aperture frame) F3 of the imaging optical system, projected to the pupil coordinates at the predetermined pupil distance $Z_p$, from the exit pupil distance LPO of the aperture frame of the imaging optical system, through Formula (7). Additionally, the CPU 121 (the signal generation unit 121b) calculates the radius R3 of the third frame (aperture frame) F3 of the imaging optical system, projected to the pupil coordinates at the predetermined pupil distance $Z_p$, from the aperture value F of the imaging optical system, through Formula (8).

Next, the CPU 121 (the signal generation unit 121b) calculates a radius R1' of the first frame used to generate the virtual focus detection signal from the first aperture parameter a1 through Formula (14A), assuming the model (FIG. 15) in which the first to third frames F1 to F3 are assumed to intersect at the same point. Similarly, the CPU 121 (the signal generation unit 121b) calculates a radius R2' of the second frame used to generate the virtual focus detection signal from the second aperture parameter a2 through Formula (14B).

In general, the first to third frames F1 to F3 do not intersect at the same point, but by modeling the frames in an arrangement where they intersect at the same point, the shapes of the first frame F1 and the second frame F2 can be calculated accurately with fewer parameters. This makes it possible to improve the accuracy of the calculation of the conversion coefficient K.

$$R1' = \frac{(a1 \times R3)^2 + R3^2}{2(a1 \times R3)} \quad (14A)$$

$$R2' = \frac{(a2 \times R3)^2 + R3^2}{2(a2 \times R3)} \quad (14B)$$

Next, the CPU 121 (the signal generation unit 121b) calculates a center C1' of the first frame used to generate the virtual focus detection signal as C1'=C3−(R1'−a1×R3) from the radius R1' of the first frame, the first aperture parameter a1, the center C3 of the third frame F3, and the radius R3.

Likewise, the CPU 121 (the signal generation unit 121b) calculates a center C2' of the second frame used to generate the virtual focus detection signal as C2'=C3−(R2'−a2×R3) from the radius R2' of the second frame, the second aperture parameter a2, the center C3 of the third frame F3, and the radius R3.

Once the above parameters have been obtained and calculated, the CPU 121 (the signal generation unit 121b) generates a first virtual partial pupil region VP₁601 and a second virtual partial pupil region VP₂602 illustrated in the upper-left part of FIG. 17.

The first virtual partial pupil region $VP_1$ 601 and the second virtual partial pupil region $VP_2$ 602 correspond to the following:
- the first pupil intensity distribution 501 and the second pupil intensity distribution 502 of the image sensor 107
- the coordinates $(x_{AF}, y_{AF})$ of the focus detection position
- the pupil eccentricity amount dX $(x_{AF}, y_{AF})$ for each individual image sensor 107 and each of the coordinates of the focus detection position
- the incident pupil distance Z+dZ $(x_{AF}, y_{AF})$ for each individual image sensor 107 and each of the coordinates of the focus detection position
- the first to third frames F1 to F3 of the imaging optical system Next, the CPU 121 (the signal generation unit 121b) projects the first virtual partial pupil region $VP_1$ 601 in the direction perpendicular to the pupil division direction and performs a scale transformation according to a magnitude $|d_{vir}|$ of a virtual defocus amount $d_{vir}$ to generate a first virtual line image A, as illustrated in the upper-center part of FIG. 17.

Likewise, the CPU 121 (the signal generation unit 121b) projects the second virtual partial pupil region $VP_2$ 602 in the direction perpendicular to the pupil division direction and performs a scale transformation according to the magnitude $|d_{vir}|$ of the virtual defocus amount $d_{vir}$ to generate a second virtual line image B.

When the virtual defocus amount $d_{vir}$ is in the forward focus state (<0), the CPU 121 (the signal generation unit 121b) laterally inverts the first virtual line image A and the second virtual line image B central to the center of gravity position of a line image A+B, which is the sum of the first virtual line image A and the second virtual line image B.

The CPU 121 (the signal generation unit 121b) performs convolution integration (convolution) of each of the first virtual line image A and the second virtual line image B with the subject signal to generate a first virtual subject image $VA_I$ and a second virtual subject image $VB_I$. This corresponds to the processing illustrated in the upper-center to upper-right parts of FIG. 17.

Next, the CPU 121 (the signal generation unit 121b) performs the processing illustrated in the upper-right to lower-right parts of FIG. 17. The CPU 121 (the signal generation unit 121b) applies signal processing to the first virtual subject image $VA_I$ and the second virtual subject image $VB_I$ sequentially and virtually. This signal processing includes optical low-pass filter processing, pixel aperture low-pass filter processing, and pixel sampling processing in the RGB Bayer array (FIG. 2).

The CPU 121 (the signal generation unit 121b) then generates the following:
- the first virtual focus detection signal $VI_1$ (j,i|$d_{vir}$,dX($x_{AF}$,$y_{AF}$),Z+dZ($x_{AF}$,$y_{AF}$),$X_{AF}$,$y_{AF}$,F,LPO,a1,a2)
- the second virtual focus detection signal $VI_2$(j,i|$d_{vir}$,dX($x_{AF}$,$y_{AF}$),Z+dZ($X_{AF}$,$y_{AF}$),$X_{AF}$,$y_{AF}$,F,LPO,a1,a2)

Figure 16:
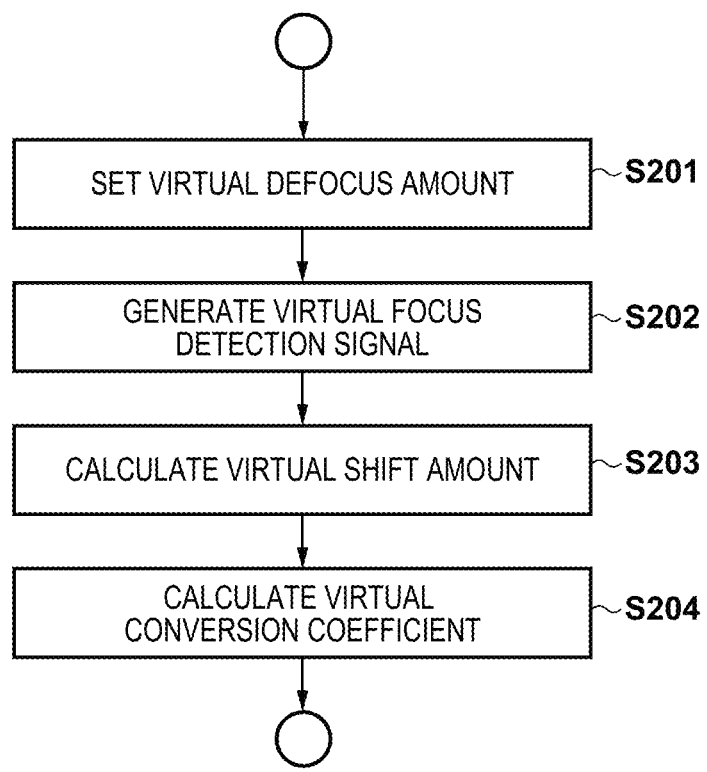
FIG. 16 is a flowchart illustrating a conversion coefficient calculation method according to the first embodiment.

In step S203 of FIG. 16 (and the lower part of FIG. 17), the CPU 121 (the focus detection unit 121c) performs focus detection processing virtually, using the first virtual focus detection signal $VI_1$ and the second virtual focus detection signal $VI_2$. The virtual focus detection processing includes the processing from the calculation of the correlation amount indicated by Formulas (13A) and (13B) in S103 to the calculation of the shift amount of the real values, and an average thereof, value in S104.

The CPU 121 (the focus detection unit 121c) then calculates a virtual shift amount $q_{vir}$ ($d_{vir}$,dX($x_{AF}$,$y_{AF}$),Z+dZ($x_{AF}$,$y_{AF}$),$x_{AF}$,$y_{AF}$,F,LPO,a1,a2).

Note that the accuracy of the calculation of the virtual shift amount $q_{vir}$ can be improved by using a plurality of types of subject signals for the convolution integration with the virtual line image. For example, the accuracy of the calculation of the virtual shift amount $q_{vir}$ can be improved by using a plurality of subject signals having different spatial frequency bands for convolutional integration with the virtual line image and performing averaging, weighting, or the like on the individual results.

In step S204 of FIG. 16, the CPU 121 (the focus detection unit 121c) divides the virtual defocus amount $d_{vir}$ by the calculated virtual shift amount $q_{vir}$. Through this, the conversion coefficient K (dX($x_{AF}$,$y_{AF}$),Z+dZ($x_{AF}$,$y_{AF}$),$x_{AF}$,$y_{AF}$,F,LPO,a1,a2) is calculated.

As described above, the accuracy of the conversion coefficient K can be improved by calculating the conversion coefficient K using a plurality of virtual defocus amounts $d_{vir}$ or subject signals. However, this increases the computation load or computation time, and thus whether or not to use a plurality of virtual defocus amounts $d_{vir}$ or subject signals may be determined taking into account the performance, load state, and the like of the CPU 121.

Returning to FIG. 14, in step S106, the CPU 121 (the focus detection unit 121c) multiplies the shift amount $q_{det}$ by the conversion coefficient K (dX($x_{AF}$,$y_{AF}$),Z+dZ($x_{AF}$,$y_{AF}$), $x_{AF}$,$y_{AF}$,F,LPO,a1,a2) to calculate the defocus amount $d_{det}$. Although an example of calculating the defocus amount $d_{det}$ for the pixel signal output from the image sensor 107 is described here, the defocus amount can also be calculated for a pixel signal already recorded into the storage medium 133.

The image capture apparatus 100 according to the present embodiment is a focus detection device that performs focus detection using pixel signals obtained by individually photoelectrically converting light that has passed through different partial regions of a pupil region of an imaging optical system. The image capture apparatus 100 generates a focus detection signal corresponding to each partial region using pixel signals, and calculates a shift amount based on the focus detection signals. The image capture apparatus 100 also applies a conversion coefficient to the shift amount to obtain a defocus amount. The image capture apparatus 100 calculates a virtual shift amount from a correlation amount of a virtual focus detection signal generated by setting a virtual defocus amount, and calculates the conversion coefficient from the virtual shift amount and the virtual defocus amount. The conversion coefficient is based on the pupil eccentricity amount of the image sensor, the incident pupil distance of the image sensor, and the aperture information of a plurality of frames in the imaging optical system.

The present embodiment describes an example in which the CPU 121 of the image capture apparatus 100 calculates the conversion coefficient K. However, it is also possible to prepare, in advance, conversion coefficients K corresponding to a plurality of combinations of the parameters (dX ($x_{AF}$,$y_{AF}$),Z+dZ($x_{AF}$,$y_{AF}$),$x_{AF}$,$y_{AF}$,F,LPO,a1,a2) of the conversion coefficient K. In this case, the conversion coefficient K can be stored in a non-volatile storage device such as the ROM 135 of the image capture apparatus 100, and used when the focus detection processing is executed.

Figure 18:
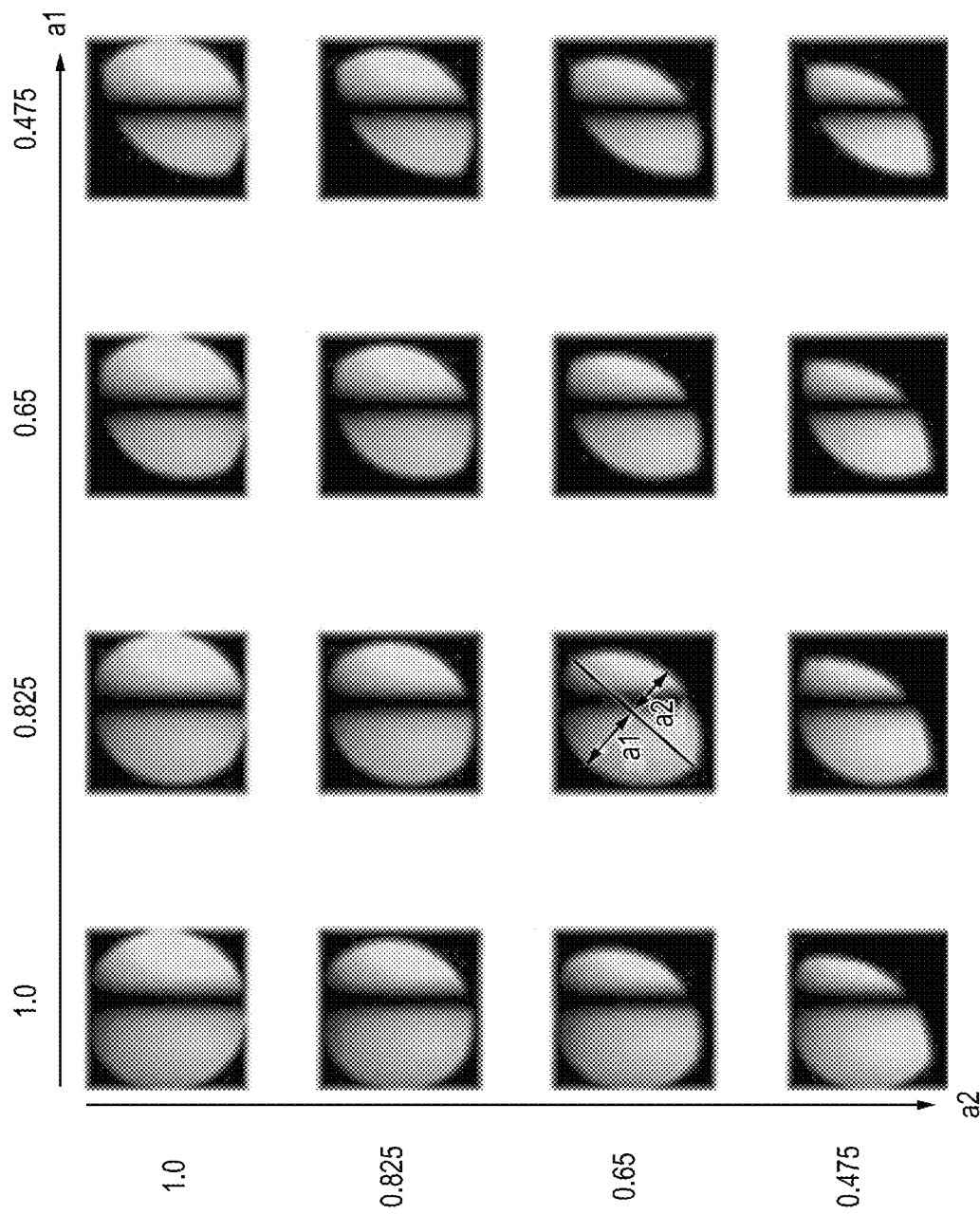
FIG. 18 is a diagram illustrating an example of change in a virtual pupil intensity distribution according to the first embodiment.

FIG. 18 illustrates an example of changes in the first virtual partial pupil region $VP_1$ 601 and the second virtual partial pupil region VP$_2$602 according to the values of the first aperture parameter a1 (0≤a1≤1) and the second aperture parameter a2 (0≤a2≤1).

Variation

By approximating the inverse of the conversion coefficient 1/K(dX(x$_{AF}$,y$_{AF}$), Z+dZ(x$_{AF}$,y$_{AF}$),x$_{AF}$,y$_{AF}$,F,LPO,a1, a2) by a polynomial function having a variable (1−a1) and a variable (1−a2), the amount of data stored in the ROM 135 of the image capture apparatus 100 can be suppressed. Specifically, a coefficient PD$_{\alpha\beta}$(dX,Z,x$_{AF}$,y$_{AF}$,F,LPO) of each degree of the polynomial function can be stored in the ROM 135.

In this case, in step S105, the CPU 121 can calculate the conversion coefficient K through the following Formula (15), instead of the process illustrated in FIG. 16.

$$K(dX, Z + dZ, x_{AF}, y_{AF}, F, LPO, a1, a2) = \frac{1}{\sum_{\alpha=0}^{2} \sum_{\beta=0}^{2} PD_{\alpha\beta}(dX, Z + dZ, x_{AF}, y_{AF}, F, LPO) \times (1 - a1)^{\alpha} \times (1 - a2)^{\beta}} \quad (15)$$

The CPU 121 calculates the conversion coefficient K by storing the coefficient PD$_{\alpha\beta}$ and applying the focus detection position, the image capturing conditions, and the like at the time of capturing an image. Calculating the conversion coefficient K using the coefficient prepared in advance and Formula (15) makes it possible to reduce the computational load on the CPU 121 and achieve high-speed focus detection.

The coefficient PD$_{\alpha\beta}$ to be stored does not use the first aperture parameter a1 and the second aperture parameter a2. Therefore, if the range of the aperture value F that can be set and the range which the exit pupil distance LPO of the aperture frame of the imaging optical system can take are determined, the conversion coefficient K can be calculated independent of the imaging optical system.

As another way to reduce the load on the CPU 121 for calculating the conversion coefficient K, the conversion coefficient K may be calculated by hardware separate from the CPU 121. A circuit for calculating the conversion coefficient K may be realized using, for example, an ASCI, an FPGA, or the like, which may be provided in the image capture apparatus 100. Additionally, using Formula (15), the conversion coefficient K may be calculated in advance for various image capturing conditions and focus detection positions and stored in at least one of the ROM 135 and the non-volatile memory in the interchangeable lens. The conversion coefficient K stored in the non-volatile memory in the interchangeable lens is obtained by the CPU 121 (the lens information obtainment unit 121d) through the lens communication circuit 130.

From FIG. 13, it can be seen that when the aperture value F is sufficiently large (the aperture opening is sufficiently small), the first partial pupil region 601 and the second partial pupil region 602 are affected almost not at all by the first frame F1 and the second frame F2, and are essentially determined by the third frame F3. This means that when the aperture value F is sufficiently large, the effect of the first aperture parameter a1 and the second aperture parameter a2 on the conversion coefficient K will be small.

Accordingly, the method of calculating the conversion coefficient K described in the present embodiment is particularly useful when the aperture value F is small (aperture opening is large). On the other hand, when the aperture value F is large (the aperture opening is small), the conversion coefficient may be obtained using a conventional method depending, on the state of the load on the CPU 121. For example, calculating the conversion coefficient using a conventional method when the aperture value F is above a threshold, and using the method of the present embodiment when the aperture value F is below the threshold, makes it possible to achieve both highly-accurate focus detection and a reduction in the computational load.

In the present embodiment, in a focus detection device that executes image plane-based phase-detection AF using the focus detection signal obtained from a two-dimensional image sensor, focus detection is performed by taking into account at least one of the pupil eccentricity amount and the change in the incident pupil distance according to the image height, which arise due to manufacturing error and the like. Specifically, the focus detection signal is generated and the shift amount is calculated, taking into account at least one of the pupil eccentricity amount and the incident pupil distance at the focus detection position. The conversion coefficient that converts the shift amount into the defocus amount are also calculated taking into account at least one of the pupil eccentricity amount and the incident pupil distance at the focus detection position.

This enables the highly-accurate calculation of a conversion coefficient suitable for the focus detection position for any combination of the image sensor actually attached and the attached interchangeable lens (imaging optical system) in an interchangeable lens-type image capture apparatus, which makes it possible to achieve high focus detection accuracy.

Second Embodiment

A second embodiment of the present invention will be described next. The first embodiment described improving the accuracy of the conversion coefficient K by calculating the conversion coefficient K taking into account the pupil eccentricity amount dX and the incident pupil distance error dZ, which vary according to the image height. The present embodiment further improves the accuracy of the conversion coefficient K by correcting for a drop in the accuracy of the conversion coefficient K caused by differences in the shape of the pupil intensity distribution.

FIGS. 19A and 19B illustrate a pupil plane X axis cross-section of a two-dimensional reference pupil intensity distribution that serves as a reference, such as design characteristics, average characteristics, and the like, and a one-dimensional correction pupil intensity distribution unique to the camera body of the image capture apparatus 100. The horizontal axis represents the incident angle [deg]. The two-dimensional pupil intensity distribution has a wider angular range and more data than the one-dimensional pupil intensity distribution. Accordingly, calculating a reference conversion coefficient K in advance using the two-dimensional reference pupil intensity distribution and then correcting the reference conversion coefficient K relative to the one-dimensional correction pupil intensity distribution unique to the camera body makes it possible to obtain a highly-accurate conversion coefficient K according to the characteristics of each individual camera body.

In FIG. 19A, 1801 indicates a pupil plane X axis cross-section of the two-dimensional reference pupil intensity distribution serving as a reference, corresponding to the first pupil intensity distribution 501 in FIG. 4, and 1802 indicates a pupil plane X axis cross-section of the two-dimensional reference pupil intensity distribution serving as a reference, corresponding to the second pupil intensity distribution 502 in FIG. 4. On the other hand, 1803 indicates the one-dimensional correction pupil intensity distribution unique to the camera body, corresponding to the first pupil intensity distribution 501 in FIG. 4, and 1804 indicates the one-dimensional correction pupil intensity distribution unique to the camera body, corresponding to the second pupil intensity distribution 502 in FIG. 4. The one-dimensional correction pupil intensity distribution unique to the camera body varies for each individual camera body (from camera body to camera body). An intersection point 1805 indicates an intersection point between pupil plane X axis cross-sections 1801 and 1802 of the pair of two-dimensional reference pupil intensity distributions, and an intersection point between the pair of one-dimensional correction pupil intensity distributions 1803 and 1804.

In FIG. 19B, 1806 indicates a corrected two-dimensional pupil intensity distribution, obtained by using the one-dimensional correction pupil intensity distribution 1803 to scale the two-dimensional reference pupil intensity distribution 1801 indicated in FIG. 19A to increase the level of matching with the shape in a region near the intersection point 1805. Likewise, 1807 indicates the pupil plane X axis cross-section of a corrected two-dimensional pupil intensity distribution, obtained by using the one-dimensional correction pupil intensity distribution 1804 to scale the two-dimensional reference pupil intensity distribution 1802 indicated in FIG. 19A to increase the level of matching with the shape in a region near the intersection point 1805.

The correction value calculation method for the conversion coefficient K according to the present embodiment will be described with reference to FIGS. 20A to 20C. In FIG. 20A, a vertically extending dotted line 1901 represents the aperture frame of the imaging optical system.

In FIG. 20B, a broken line 1902 indicates a line image derived by adding the effect of vignetting caused by the aperture frame 1901 to the pupil plane X axis cross-section 1801 of the two-dimensional reference pupil intensity distribution.

Additionally, a broken line 1903 indicates a line image derived by adding the effect of vignetting caused by the aperture frame 1901 to the pupil plane X axis cross-section 1802 of the two-dimensional reference pupil intensity distribution.

A solid line 1904 indicates a line image derived by adding the effect of vignetting caused by the aperture frame 1901 to the pupil plane X axis cross-section 1806 of the corrected two-dimensional pupil intensity distribution.

A solid line 1905 (solid line) indicates a line image derived by adding the effect of vignetting caused by the aperture frame 1901 to the pupil plane X axis cross-section 1807 of the corrected two-dimensional pupil intensity distribution.

Additionally, 1906 (BL1) indicates a baseline length that is the difference between the centers of gravity of the line images 1902 and 1903, and 1907 (BL2) indicates a baseline length that is the difference between the centers of gravity of the line images 1904 and 1905.

In the present embodiment, a highly-accurate correction value for the conversion coefficient K is calculates based on a ratio of these baseline lengths BL1 and BL2. Specifically, a correction value Correction_K for the conversion coefficient K is calculated through the following Formula (16), using the baseline length 1906 (BL1) and the baseline length 1907 (BL2) indicated in FIG. 20B.

$$\text{Correction\_K} = \frac{BL1}{BL2} \quad (16)$$

The conversion coefficient is the inverse of the baseline length, and thus the correction value Correction_K applied to the conversion coefficient is calculated as the ratio of the baseline length 1906 (BL1) to the baseline length 1907 (BL2). When correcting the baseline length, the correction value is BL2/BL1.

Note that the correction value Correction_K of the conversion coefficient may have a form aside from that indicated by Formula (16) if derived based on the ratio between baseline length information of the two-dimensional reference pupil intensity distribution in the design and baseline length information of the one-dimensional correction pupil intensity distribution serving as unique information of the image capture apparatus.

The accuracy of the conversion coefficient can be improved by applying the correction value Correction_K of the conversion coefficient derived through Formula (16). Furthermore, when applying band pass filter processing to the focus detection signal at the time of focus detection, the correction value is calculated taking into account the spatial frequency band of the focus detection signal, which makes it possible to realize a further improvement in the accuracy of the conversion coefficient.

In FIG. 20C,
a broken line 1908 indicates a result of applying band pass filter processing to the line image 1902 (an absolute value);
a broken line 1909 indicates a result of applying band pass filter processing to the line image 1903 (an absolute value);
a solid line 1910 indicates a result of applying band pass filter processing to the line image 1904 (an absolute value); and
a solid line 1911 indicates a result of applying band pass filter processing to the line image 1905 (an absolute value).

Additionally, 1912 (BL1') indicates a baseline length that is the difference between the centers of gravity of the line images (absolute values) after the band pass filter processing, indicated by broken lines 1908 and 1909. Likewise, 1913 (BL2') indicates a baseline length that is the difference between the centers of gravity of the line images (absolute values) after the band pass filter processing, indicated by solid lines 1910 and 1911.

The CPU 121 (the focus detection unit 121c) applies a band pass filter similar to the one applied to the focus detection signal in the focus detection processing to each of the line images 1902 to 1905, and derives the line images (absolute values) 1908 to 1911 after the filter processing. The CPU 121 (the focus detection unit 121c) then obtains the baseline length 1912 (BL1'), which is the difference between the centers of gravity of the line images (absolute values) 1908 and 1909 after the filter processing. Likewise, the CPU 121 (the focus detection unit 121c) calculates the baseline length 1913 (BL2'), which is the difference between the centers of gravity of the line images (absolute values) 1910 and 1911 after the filter processing, and calculates the correction value Correction_K for the conversion coefficient K through Formula (17).

$$\text{Correction\_K} = \frac{BL1'}{BL2'} \quad (17)$$

Formulas (16) and (17) are essentially the same except for the difference in the processing of the line image to calculate the baseline length. Accordingly, even when band pass filter processing is applied to a line image, the correction value Correction_K of the conversion coefficient may be in a form other than that indicated in Formula (17).

The correction value Correction_K of the conversion coefficient may be calculated for each coordinate of the focus detection position, may be calculated only for a plurality of discrete representative coordinates, and for the other coordinates, may be calculated through interpolation or the like.

The curve shape in the region near the intersection point 1805 of the first pupil intensity distribution 501 and the second pupil intensity distribution 502 changes little with the coordinates of the image sensor 107. Accordingly, the correction value Correction_K of the conversion coefficient also changes little with the coordinates of the image sensor 107. Using this characteristic, for example, the correction value Correction_K of the conversion coefficient may be calculated for one coordinate near the center coordinate (0,0) and used as a common correction value for all conversion coefficients.

The coordinates for calculating the correction value Correction_K used in common can be the center coordinate (0,0), where the maximum distance from the focus detection position is short, or the vicinity thereof. Note that the correction value Correction_K of the conversion coefficient may be calculated through a method that does not use a baseline length. For example, the correction value Correction_K of the conversion coefficient can also be calculated based on a relative relationship between the two-dimensional reference pupil intensity distribution serving as a reference and the one-dimensional correction pupil intensity distribution unique to the camera body.

Note that a value stored in advance may be used for the correction value Correction_K of the conversion coefficient, rather than the CPU 121 (the focus detection unit 121$c$) calculating the value. For example, the correction value Correction_K corresponding to the conversion coefficient K for each image height may be stored in advance in the ROM 135, and the conversion coefficient K and the correction value Correction_K of the conversion coefficient may then be obtained according to the lens information and the image height lens information of the focus detection position.

The CPU 121 (the focus detection unit 121$c$) calculates a final conversion coefficient K' to be used in the focus detection processing through Formula (18), using the conversion coefficient K calculated in the first embodiment and the correction value Correction_K.

$$K' = \text{Correction}_K \cdot K \quad (18)$$

Figure 14:
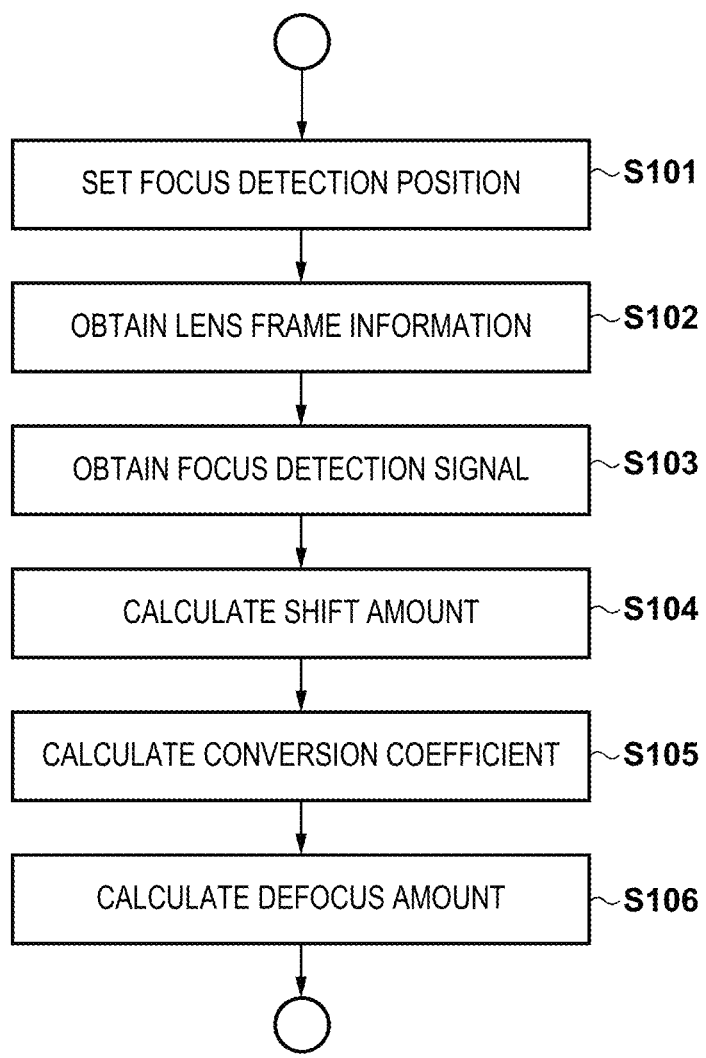
FIG. 14 is a flowchart illustrating a focus detection method according to the first embodiment.

The CPU 121 (the focus detection unit 121$c$ uses the conversion coefficient K' calculated in this manner in the calculation of the defocus amount in step S106 of FIG. 14. In other words, the CPU 121 (the focus detection unit 121$c$) calculates the defocus amount $d_{det}$ as indicated by Formula (19) by applying the conversion coefficient K', obtained by correcting the conversion coefficient K obtained in step S105, to the shift amount $q_{det}$ obtained in step S104.

$$d_{det} = K' q_{det} \quad (19)$$

Although an example of calculating the defocus amount $d_{det}$ for the pixel signal output from the image sensor 107 is described in the present embodiment as well, the defocus amount can also be calculated for a pixel signal already recorded into the storage medium 133.

In the present embodiment, the conversion coefficient K calculated using the two-dimensional reference pupil intensity distribution is corrected according to a difference between the shapes of the two-dimensional reference pupil intensity distribution serving as a reference and the one-dimensional correction pupil intensity distribution unique to the image capture apparatus. Through this, a more accurate conversion coefficient can be calculated by correcting for the effect on the accuracy of the conversion coefficient of differences in the shapes of the pupil intensity distributions caused by, for example, variations in the height of the microlenses in the image sensor attached to the image capture apparatus. A further improvement in the focus detection accuracy can therefore be realized in addition to the effects of the first embodiment.

Third Embodiment

A third embodiment of the present invention will be described next. In the present embodiment, the configuration of the image sensor 107, and specifically, the method for dividing into sub-pixels, is different from that of the first and second embodiments. The other configurations are the same as in the first and second embodiment, and thus redundant descriptions will not be provided.

Figure 21:
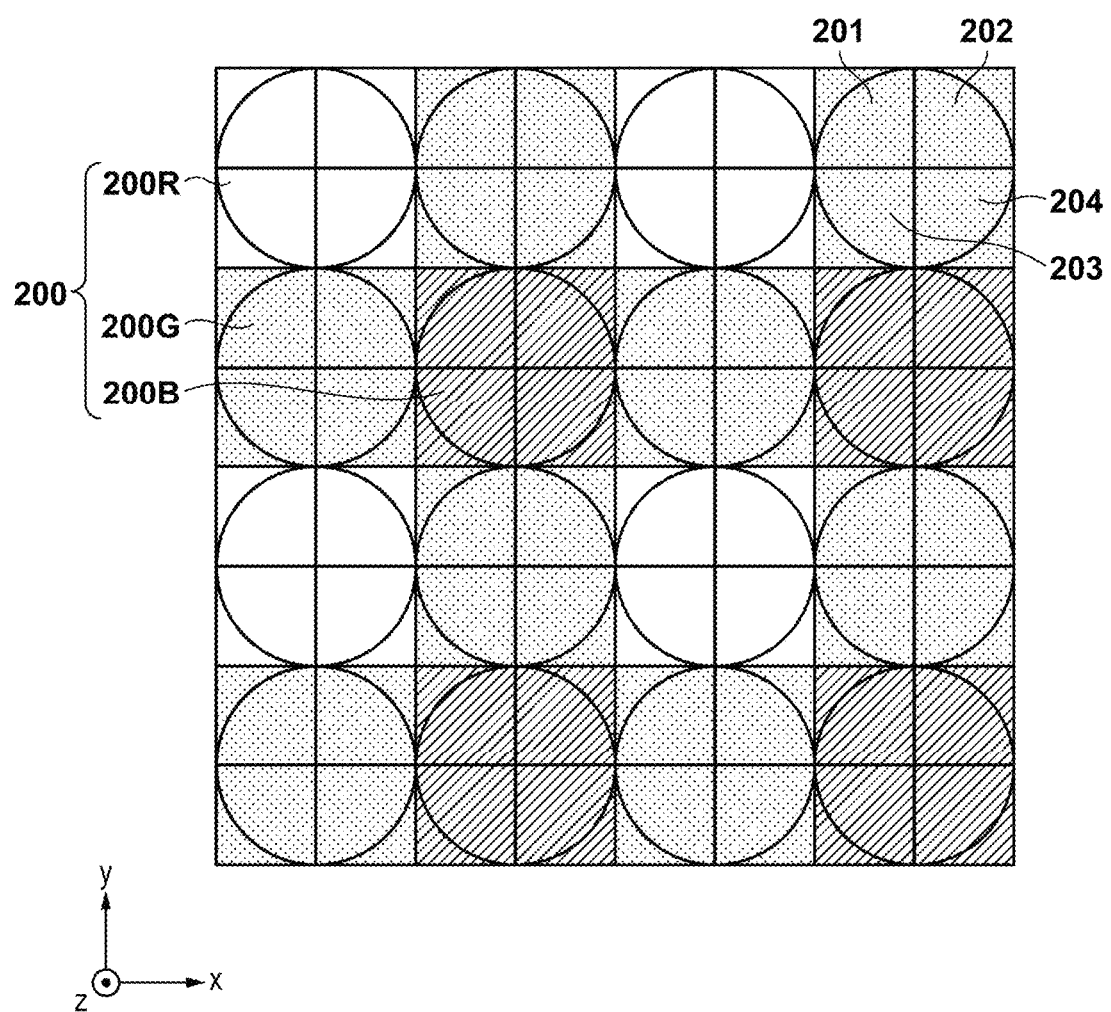
FIG. 21 is a diagram illustrating a pixel array according to a third embodiment.
Figure 22B:
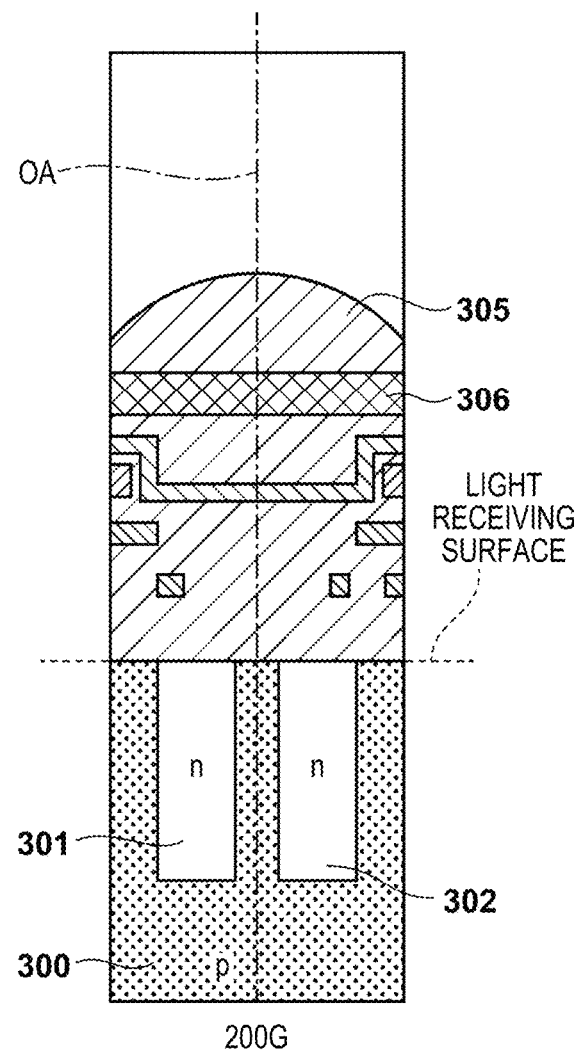
FIGS. 22A and 22B are diagrams illustrating a pixel structure according to the third embodiment.

Specifically, as illustrated in FIGS. 21 to 22B, in the image sensor 107 according to the present embodiment, the photoelectric conversion unit of each pixel is divided in two, in both the column direction and the row direction, resulting in first to fourth sub-pixels 201 to 204. The image capture signal (the captured image) is generated by adding the signals of the first to fourth sub-pixels 201 to 204 for each pixel.

Figure 22A:
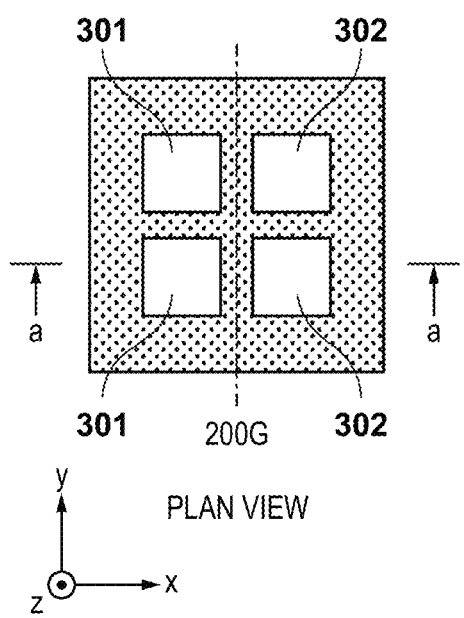

FIG. 21 is a diagram illustrating a pixel (image capturing pixel) array of the image sensor 107. FIGS. 22A and 22B are diagrams illustrating the pixel structure of the image sensor 107, where FIG. 22A is a plan view of the pixel 200G of the image sensor 107 (viewed from the +z direction), and FIG. 22B is a cross-sectional view along line a-a in FIG. 22A (viewed from the −y direction). In FIGS. 21 to 22B, elements that are the same as those in FIGS. 2 to 3B are given the same reference numerals, and descriptions thereof will be omitted.

FIG. 21 illustrates the pixel (unit pixel) array of the image sensor 107 according to the present embodiment in a range of four columns by four rows, and a sub-pixel array in a range of eight columns by eight rows.

A primary color Bayer array color filter is provided on the four column-by-four row pixel group 200, in the same manner as in FIG. 2. Furthermore, each pixel (unit pixel) is constituted by a plurality of sub-pixels, namely the first to fourth sub-pixels 201 to 204, by having the photoelectric conversion region thereof divided in two in both the x direction and the y direction.

The first to fourth sub-pixels 201 to 204 share a single microlens. The first sub-pixel 201 receives a light flux passing through a first partial pupil region of the imaging optical system. The second sub-pixel 202 receives a light flux passing through a second partial pupil region of the imaging optical system. The third sub-pixel 203 receives a light flux passing through a third partial pupil region of the imaging optical system. The fourth sub-pixel 204 receives a light flux passing through a fourth partial pupil region of the imaging optical system.

The image sensor 107 according to the present embodiment, for example, has a pixel period P of 6 μm, and the number of pixels N is 6,000 horizontal columns×4,000 vertical rows, for a total of 24 million pixels. Accordingly, the image sensor 107 has a sub-pixel period PSUB of 3 µm in the column direction and the row direction, respectively, and a number of sub-pixels NSUB of 12,000 horizontal columns×8,000 vertical rows, for a total of 96 million pixels.

As illustrated in FIG. 22B, the pixel 200G according to the present embodiment is provided with the microlenses 305 for focusing incident light on the light receiving surface-side of the pixel. A plurality of the microlenses 305 are arranged in a two-dimensional pattern, and are located at a predetermined distance in the z axis direction (the direction of the optical axis OA) from the light receiving surface. Additionally, first photoelectric conversion units 301, 302, 303, and 304, which are divided $N_H$ times (two divisions) in the x direction and $N_V$ times (two divisions) in the y direction, are formed in the pixel 200G. The first photoelectric conversion units 301 to 304 correspond to the sub-pixels 201 to 204, respectively.

In the present embodiment, the first focus detection signal is generated based on the pixel signals of the first sub-pixel 201 and the third sub-pixel 203 in each pixel of the image sensor 107, and the second focus detection signal is generated based on the pixel signals of the second sub-pixel 202 and the fourth sub-pixel 204 of each pixel. By adding the pixel signals of the first to fourth sub-pixels 201 to 204 of each pixel in the image sensor 107, an image capture signal (captured image) having the resolution of the effective pixel number N can be generated.

Note that the first focus detection signal may be generated based on the pixel signals of the first sub-pixel 201 and the second sub-pixel 202, and the second focus detection signal may be generated based on the pixel signals of the third sub-pixel 203 and the fourth sub-pixel 204. Alternatively, the first focus detection signal may be generated based on the pixel signals of the first sub-pixel 201 and the fourth sub-pixel 204, and the second focus detection signal may be generated based on the pixel signals of the second sub-pixel 202 and the third sub-pixel 203.

Focus detection can be performed according to either of the first and second embodiments, aside from the pixel signals used to generate the first focus detection signal and the second focus detection signal being different. The present embodiment provides an effect of making it possible to change the pupil division direction dynamically, in addition to the effects of the first or second embodiment.

OTHER EMBODIMENTS

The image capturing unit and image capture apparatus described in the embodiments can be used in a variety of applications. For example, the image capturing unit can be used for sensing not only visible light, but also infrared light, ultraviolet light, X-rays, and other types of light. Although the image capture apparatus is represented by a digital camera, the image capture apparatus can also be applied to other devices, such as cell phones having cameras, i.e., smartphones, surveillance cameras, and game consoles. The image capturing apparatus can furthermore be applied in medical equipment for endoscopy, blood vessel imaging, and the like, beauty equipment for observing the skin, the scalp, and the like, and video cameras for capturing sports and action videos. The image capturing apparatus can furthermore be applied to traffic cameras such as traffic, ship monitoring, and dashcams, cameras for academic purposes such as astronomical observation, specimen observation, and the like, household appliances including cameras, machine vision, and the like. Machine vision in particular is not limited to robots in factories, and can also be used in agriculture, fisheries, and the like.

The configurations of the image capture apparatus described in the foregoing embodiments are merely examples, and the image capture apparatus in which the present invention can be applied is not limited to that illustrated in FIG. 1. The circuit configuration of each part of the image capture apparatus is also not limited to the configurations illustrated in the drawings.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-30626, filed on Feb. 26, 2021, and No. 2021-93767, filed on Jun. 3, 2021, which are hereby incorporated by reference herein in their entirety.

What is claimed is:

1. A focus detection device comprising:
   one or more processors that execute a program stored in a memory and thereby function as:
   a generation unit that generates a first focus detection signal and a second focus detection signal based on a signal obtained from an image sensor;
   a first calculation unit that calculates a shift amount between the first focus detection signal and the second focus detection signal;
   a second calculation unit that calculates a conversion coefficient for converting the shift amount into a defocus amount of an imaging optical system; and
   a detection unit that detects the defocus amount by applying the conversion coefficient to the shift amount,
   wherein the second calculation unit calculates the conversion coefficient based on at least one of a pupil eccentricity amount and an incident pupil distance, and wherein the pupil eccentricity amount and the incident pupil distance have values based on stored values having different values corresponding to coordinates in two or more of four quadrants of a pixel region of the image sensor.

2. The focus detection device according to 1, wherein the second calculation unit obtains the pupil eccentricity amount at a focus detection position by interpolating or extrapolating the stored values of pupil eccentricity amounts corresponding to the coordinates, to use the pupil eccentricity amount in the calculation of the conversion coefficient.

3. The focus detection device according to 1, wherein the second calculation unit obtains the incident pupil distance at a focus detection position by interpolating or extrapolating the stored values of incident pupil distances corresponding to the coordinates, to use the incident pupil distance in the calculation of the conversion coefficient.

4. The focus detection device according to claim 1, wherein the second calculation unit calculates the conversion coefficient based on aperture information of a plurality of frames included in the imaging optical system, in addition to at least one of the pupil eccentricity amount and the incident pupil distance.

5. The focus detection device according to claim 1, wherein the second calculation unit calculates the conversion coefficient by dividing a virtual defocus amount by a shift amount between the first focus detection signal and the second focus detection signal, the shift amount being calculated by the first calculation unit for the virtual defocus amount.

6. The focus detection device according to claim 1, wherein the second calculation unit calculates the conversion coefficient using a coefficient of a polynomial function, the polynomial function having aperture parameters as variables and approximating an inverse of the conversion coefficient, and
wherein the aperture parameters are obtained from information of frames included in the imaging optical system.

7. The focus detection device according to claim 1, wherein the second calculation unit calculates the conversion coefficient based on fixed values for the pupil eccentricity amount and the incident pupil distance when an aperture value during image capturing is greater than or equal to a threshold.

8. The focus detection device according to claim 1, wherein the second calculation unit corrects the conversion coefficient based on a difference between a shape of a two-dimensional pupil intensity distribution serving as a reference and a shape of a one-dimensional pupil intensity distribution unique to the focus detection device, and
the detection unit detects the defocus amount by applying, to the shift amount, the conversion coefficient that has been corrected.

9. The focus detection device according to claim 8, wherein the second calculation unit corrects the conversion coefficient using a ratio between (i) a baseline length of a pair of line images obtained from a pair of the two-dimensional pupil intensity distributions corresponding to different partial regions of an exit pupil of the imaging optical system and (ii) a baseline length of a pair of line images obtained from the two-dimensional pupil intensity distribution corrected based on the one-dimensional pupil intensity distribution corresponding to the pair of the two-dimensional pupil intensity distributions.

10. The focus detection device according to claim 1, wherein a pixel of the image sensor includes a plurality of sub-pixels, and the generation unit generates the first focus detection signal and the second focus detection signal based on signals obtained from mutually-different sub-pixels.

11. The focus detection device according to claim 1, wherein the second calculation unit calculates the pupil eccentricity amount using two or more of stored values of pupil eccentricity amounts being stored for one or more coordinates for each of the four quadrants of the pixel region of the image sensor.

12. The focus detection device according to claim 11, wherein coordinates for which the values of the pupil eccentricity amount are stored are arranged to be point-symmetrical with respect to a center of the pixel region of the image sensor as well as symmetrical across coordinate axes of an orthogonal coordinate system of which origin is the center of the pixel region.

13. The focus detection device according to claim 1, wherein the second calculation unit calculates the incident pupil distance using two or more of stored values of incident pupil distances being stored for one or more coordinates for each of the four quadrants of the pixel region of the image sensor.

14. The focus detection device according to claim 13, wherein coordinates for which the values of the incident pupil distance are stored are arranged to be point-symmetrical with respect to a center of the pixel region of the image sensor as well as symmetrical across coordinate axes of an orthogonal coordinate system of which origin is the center of the pixel region.

15. The focus detection device according to claim 1, further comprising a non-volatile memory that stores, for one or more coordinates for each of the four quadrants of the pixel region of the image sensor, values of a pupil eccentricity amount and an incident pupil distance.

16. The focus detection device according to claim 15, wherein coordinates for which the values of the pupil eccentricity amount and the incident pupil distance are stored are arranged to be point-symmetrical with respect to a center of the pixel region of the image sensor as well as symmetrical across coordinate axes of an orthogonal coordinate system of which origin is the center of the pixel region.

17. The focus detection device according to claim 15, wherein the non-volatile memory further stores values of a pupil eccentricity amount and an incident pupil distance for coordinates corresponding to a center of the pixel region of the image sensor.

18. An image capture apparatus, comprising:
an image sensor; and
a focus detection device that comprises:
one or more processors that execute a program stored in a memory and thereby function as:
a generation unit that generates a first focus detection signal and a second focus detection signal based on a signal obtained from an image sensor;
a first calculation unit that calculates a shift amount between the first focus detection signal and the second focus detection signal;
a second calculation unit that calculates a conversion coefficient for converting the shift amount into a defocus amount of an imaging optical system; and a detection unit that detects the defocus amount by applying the conversion coefficient to the shift amount, wherein the second calculation unit calculates the conversion coefficient based on at least one of a pupil eccentricity amount and an incident pupil distance, and wherein the pupil eccentricity amount and the incident pupil distance have values based on stored values having different values corresponding to coordinates in two or more of four quadrants of a pixel region of the image sensor, wherein focus of an imaging optical system is adjusted based on a defocus amount detected by the focus detection device.

19. A focus detection method executed by a focus detection device, the focus detection method comprising:

generating a first focus detection signal and a second focus detection signal based on a signal obtained from an image sensor;

calculating a shift amount between the first focus detection signal and the second focus detection signal;

calculating a conversion coefficient for converting the shift amount into a defocus amount of an imaging optical system; and detecting the defocus amount by applying the conversion coefficient to the shift amount, wherein the calculating of the conversion coefficient includes calculating the conversion coefficient based on at least one of a pupil eccentricity amount and an incident pupil distance, and wherein the pupil eccentricity amount and the incident pupil distance have values based on stored values having different values corresponding to coordinates in two or more of four quadrants of a pixel region of the image sensor.

20. A non-transitory computer-readable medium storing a program that causes, when executed by a computer of a focus detection device, the computer to function as:

a generation unit that generates a first focus detection signal and a second focus detection signal based on a signal obtained from an image sensor;

a first calculation unit that calculates a shift amount between the first focus detection signal and the second focus detection signal;

a second calculation unit that calculates a conversion coefficient for converting the shift amount into a defocus amount of an imaging optical system; and a detection unit that detects the defocus amount by applying the conversion coefficient to the shift amount, wherein the second calculation unit calculates the conversion coefficient based on at least one of a pupil eccentricity amount and an incident pupil distance, and wherein the pupil eccentricity amount and the incident pupil distance have values based on stored values having different values corresponding to coordinates in two or more of four quadrants of a pixel region of the image sensor.

* * * * *